(12) United States Patent
Ishino

(10) Patent No.: US 9,279,488 B2
(45) Date of Patent: Mar. 8, 2016

(54) CONTINUOUSLY VARIABLE TRANSMISSION AND WORKING VEHICLE

(71) Applicant: Kanzaki Kokyukoki Mfg. Co., Ltd., Amagasaki-shi, Hyogo (JP)

(72) Inventor: Fumitoshi Ishino, Amagasaki (JP)

(73) Assignee: KANZAKI KOKYUKOKI MFG. CO., LTD., Amagasaki-Shi, Hyogo (JP)

( * ) Notice: Subject to any disclaimer, the term of this patent is extended or adjusted under 35 U.S.C. 154(b) by 374 days.

(21) Appl. No.: 13/864,960

(22) Filed: Apr. 17, 2013

(65) Prior Publication Data

US 2013/0281236 A1    Oct. 24, 2013

(30) Foreign Application Priority Data

Apr. 18, 2012  (JP) .................................. 2012094681

(51) Int. Cl.

| F16H 37/02 | (2006.01) |
|---|---|
| F16H 37/08 | (2006.01) |
| B60K 17/08 | (2006.01) |
| F16H 57/035 | (2012.01) |
| F16H 48/08 | (2006.01) |
| F16H 48/24 | (2006.01) |
| F16H 57/021 | (2012.01) |

(52) U.S. Cl.
CPC .............. *F16H 37/022* (2013.01); *B60K 17/08* (2013.01); *F16H 37/0846* (2013.01); *F16H 57/035* (2013.01); *B60Y 2200/223* (2013.01); *F16H 48/08* (2013.01); *F16H 48/24* (2013.01); *F16H 2037/088* (2013.01); *F16H 2057/0216* (2013.01)

(58) Field of Classification Search
CPC ................ B60K 17/08; B60Y 2200/23; F16H 2037/088; F16H 2057/0216; F16H 37/022; F16H 37/0846; F16H 48/08; F16H 48/24; F16H 57/035

USPC ....................................................... 474/72, 29
See application file for complete search history.

(56) References Cited

U.S. PATENT DOCUMENTS

| 4,624,153 | A | * | 11/1986 | Itoh et al. ......................... 475/66 |
| 4,726,256 | A | | 2/1988 | von Kaler et al. |
| 5,041,067 | A | | 8/1991 | Hauser |
| 5,720,686 | A | | 2/1998 | Yan et al. |
| 5,848,949 | A | * | 12/1998 | Miyata et al. .................. 475/210 |
| 6,852,055 | B2 | * | 2/2005 | Kmicikiewicz .................... 475/5 |
| 8,845,474 | B2 | * | 9/2014 | Kochidomari et al. ........ 475/202 |
| 2010/0120565 | A1 | | 5/2010 | Kochidomari et al. |

FOREIGN PATENT DOCUMENTS

| EP | 0 257 704 A1 | 3/1988 |
| EP | 0 881 410 A1 | 12/1998 |
| JP | 62-028554 | 2/1987 |

OTHER PUBLICATIONS

European Search Report based on Application No. EP 13164181.3, dated Jun. 13, 2013, 3 pages.

* cited by examiner

*Primary Examiner* — William E Dondero
*Assistant Examiner* — Robert T Reese
(74) *Attorney, Agent, or Firm* — Sterne, Kessler, Goldstein & Fox P.L.L.C.

(57) ABSTRACT

A belt type variable speed-change mechanism transmitting a rotational power from a driving shaft to a driven shaft in a continuously variable manner and a constant-speed power-transmitting mechanism transmitting a rotational power at a constant-speed from the driving shaft to a constant-speed driven-side rotational body supported by the driven shaft in a relatively rotatable manner with respect thereto are accommodated in a casing. A planetary gear mechanism including a first element receiving a variable-speed rotational power through the driven shaft, a second element receiving a constant-speed rotational power through the constant-speed driven-side rotational body and a third element outputting a combined rotational power is supported by the driven shaft in the casing.

6 Claims, 18 Drawing Sheets

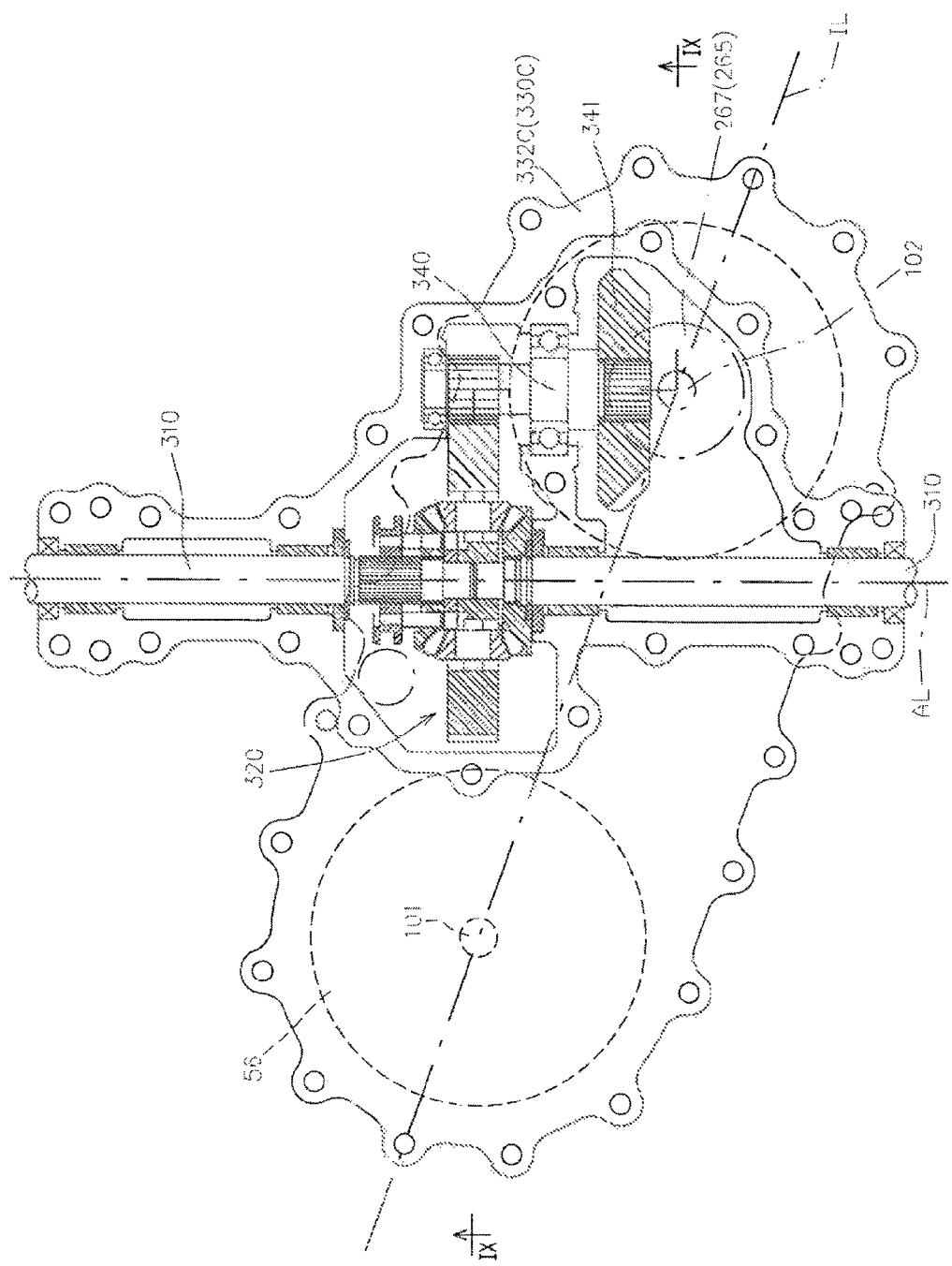

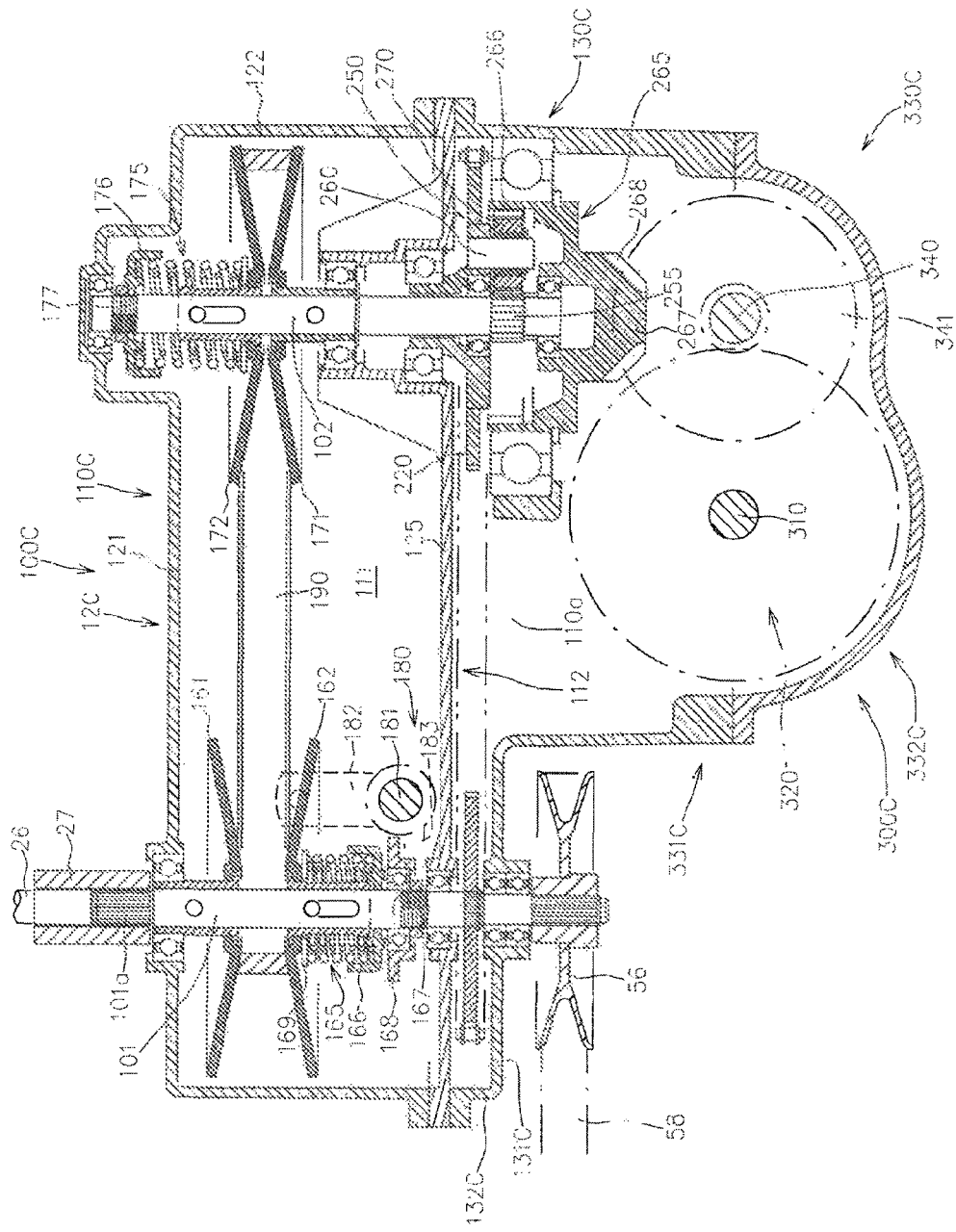

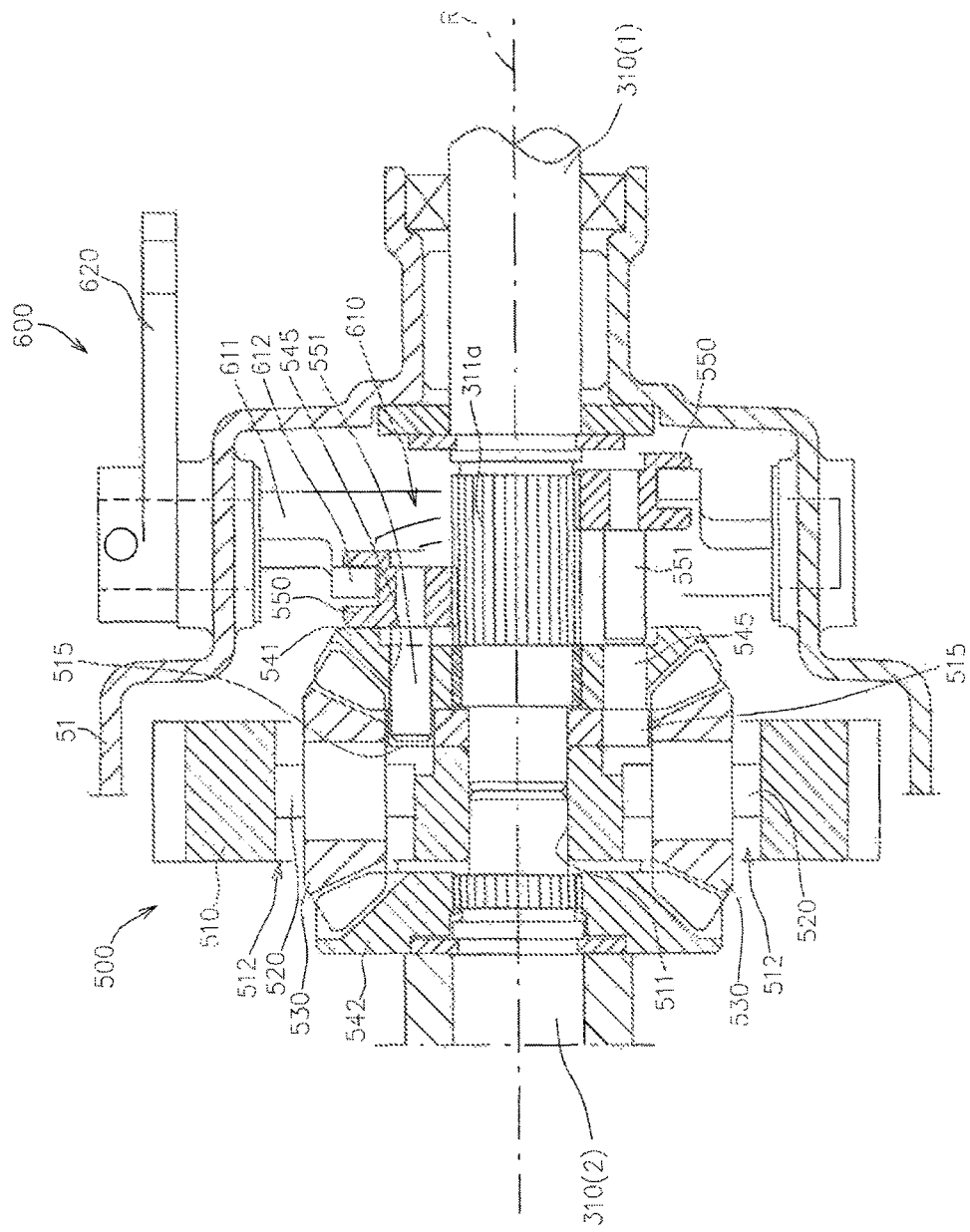

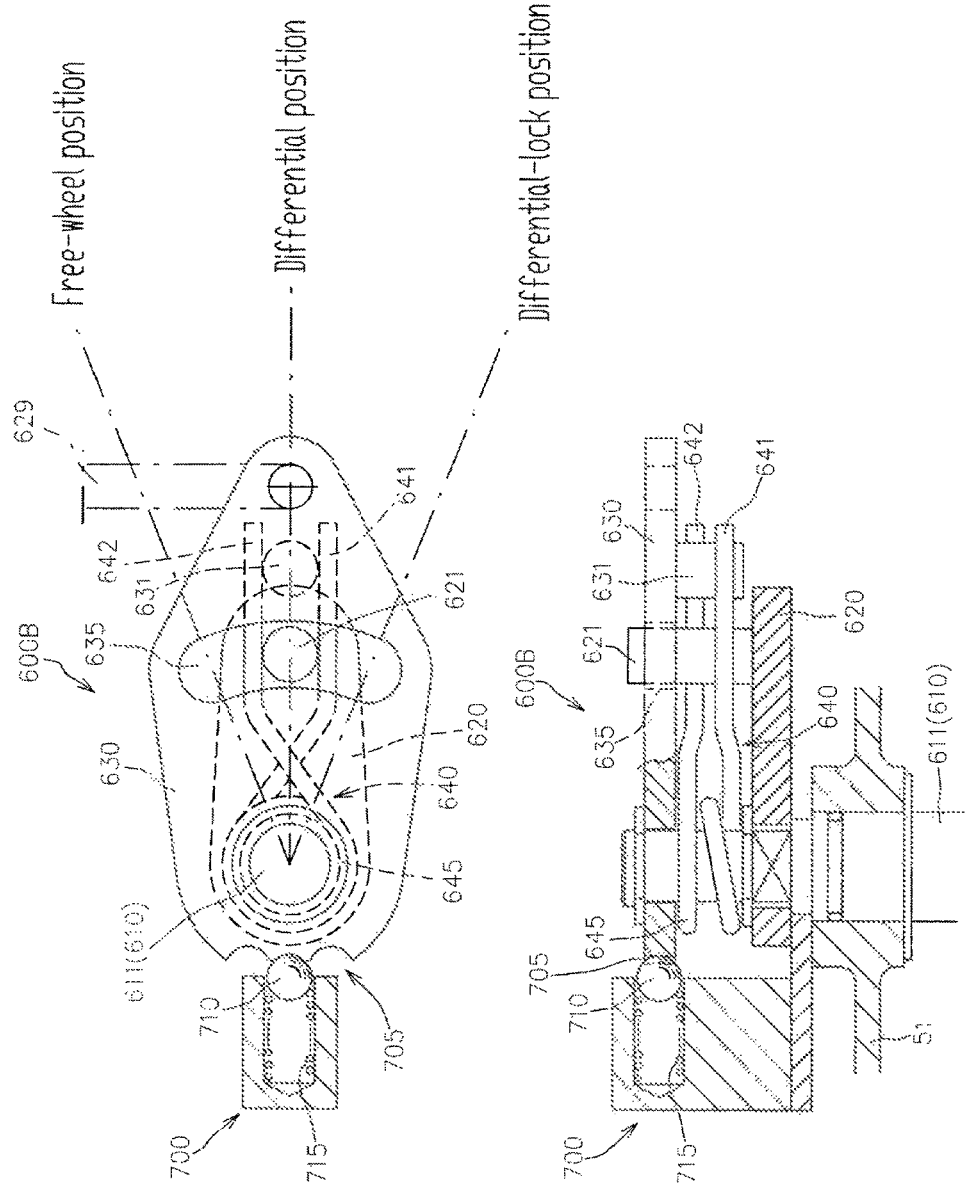

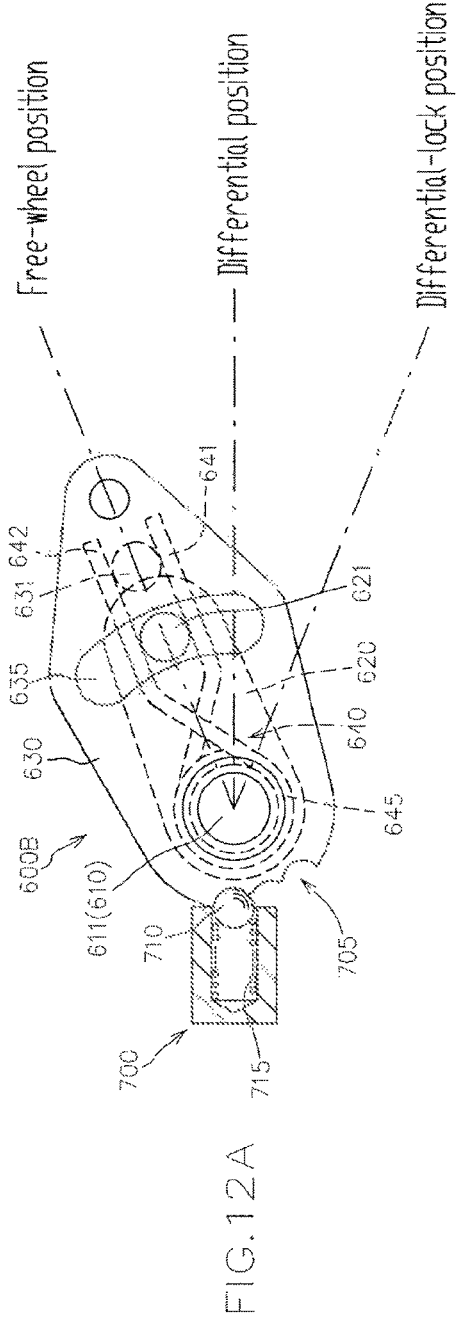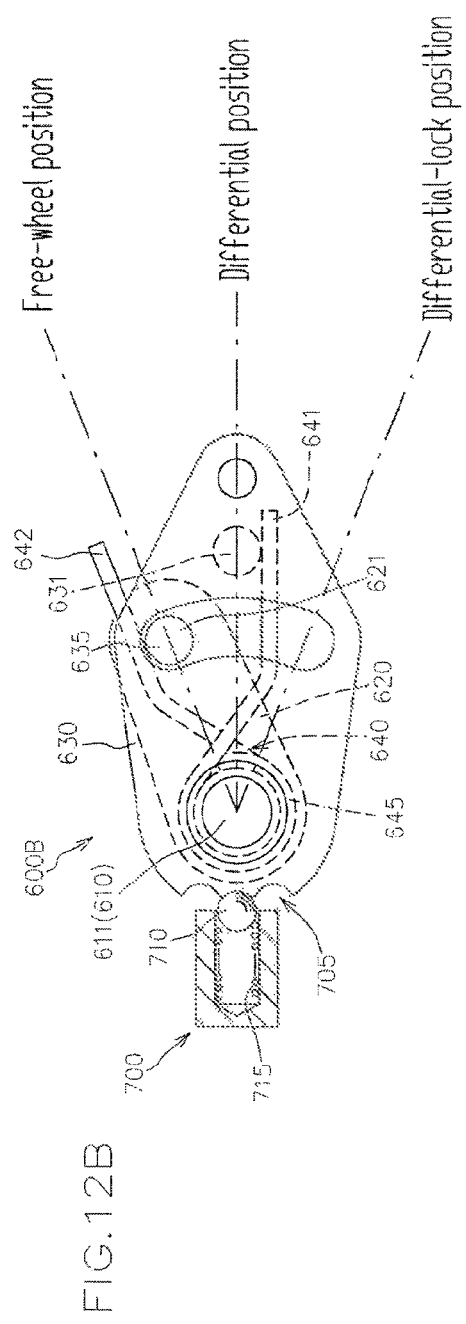
FIG.12A
FIG.12B

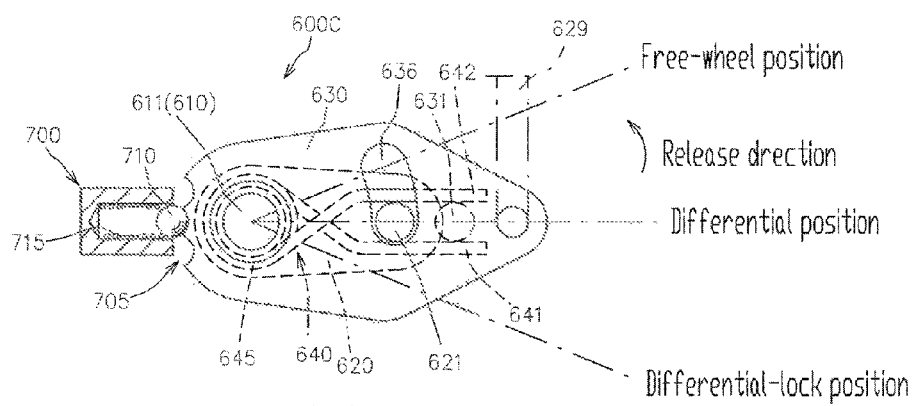
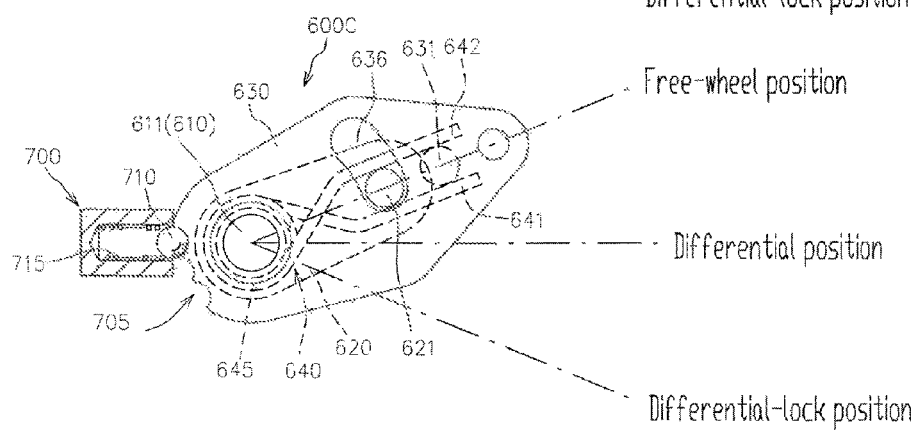

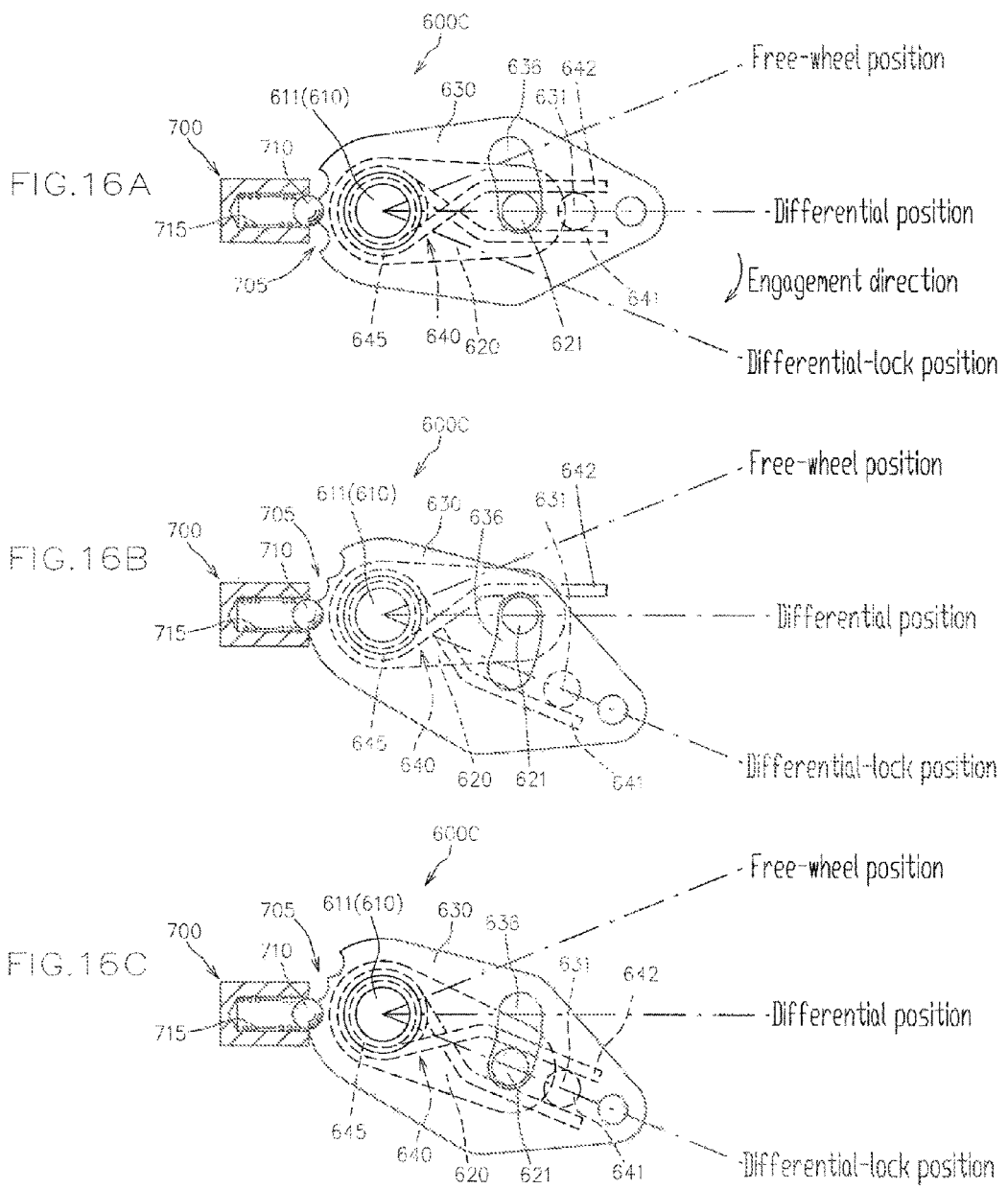

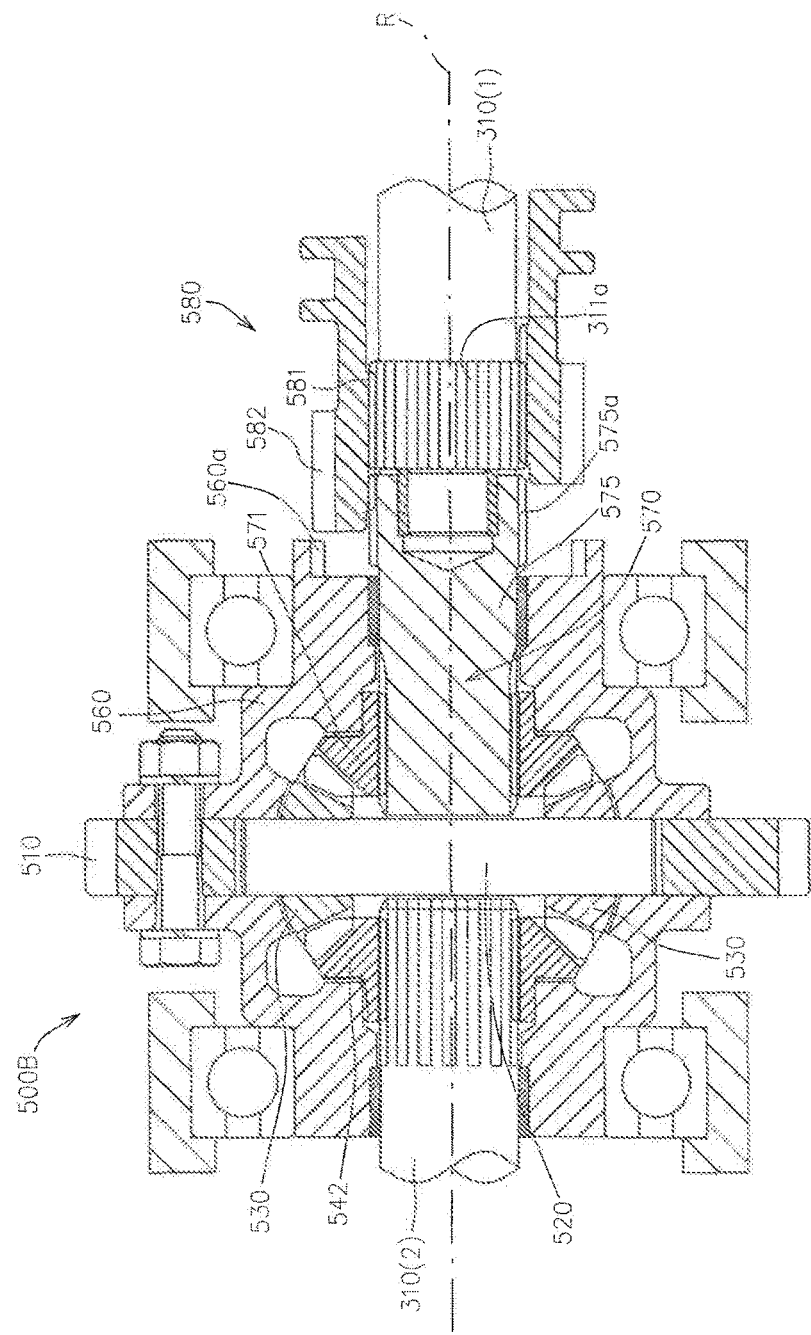

CONTINUOUSLY VARIABLE TRANSMISSION AND WORKING VEHICLE

BACKGROUND OF THE INVENTION

1. Field of the Invention

The present invention relates to a continuously variable transmission including a belt type variable speed-change mechanism capable of continuously changing a speed of a rotational power from a driving power source, an endless member type power-transmitting mechanism that transmits the rotational power from the driving power source at a constant speed, and a planetary gear mechanism that combines a variable-speed rotational power transmitted from the belt type variable speed-change mechanism and a constant-speed rotational power transmitted from the endless member type power-transmitting mechanism and then output the combined rotational power, and a working vehicle including the continuously variable transmission.

2. Related Art

There have been previously proposed a continuously variable transmission (see, for example, Japanese unexamined patent application publication No. S62-028554 and U.S. Pat. No. 5,041,067, which are hereinafter referred to as prior art documents 1 and 2, respectively) that includes a belt type variable speed-change mechanism, an endless member type power-transmitting mechanism and a planetary gear mechanism, wherein a variable-speed rotational power, which is transmitted through the belt type variable speed-change mechanism from a driving power source, is input into a first element of the planetary gear mechanism, a constant-speed rotational power, which is transmitted through the endless member type power-transmitting mechanism from the driving power source, is input into a second element of the planetary gear mechanism, and a combined rotational power is output from a third element of the planetary gear mechanism.

This type continuously variable transmission is useful in that continuously variable-speed rotational power in both normal and reverse directions can be output from the third element by operating the belt type variable speed-change mechanism.

However, there is room for improvement in the conventional continuously variable transmission in view of miniaturization and formation of an overall power transmitting path.

The conventional continuously variable transmission disclosed in the prior art documents 1 and 2 is configured so that the continuously variable-speed rotational power is transmitted from a driving shaft operatively connected to the driving power source to a variable-speed driven shaft disposed parallel to the driving shaft through the belt type variable speed-change mechanism, while the constant-speed rotational power is transmitted from the driving shaft to a constant-speed driven shaft that is disposed parallel to the driving shaft and that is separate from the variable-speed driven shaft through the endless member type power-transmitting mechanism.

In the configuration, the planetary gear mechanism is supported by the constant-speed driven shaft.

More specifically, the first element is supported on the constant-speed driven shaft in a relatively rotatable manner with respect thereto in a state where the first element is operatively connected to a variable-speed gear supported by the variable-speed driven shaft in a relatively non-rotatable manner with respect thereto, the second element is supported by the constant-speed driven shaft in a relatively non-rotatable manner, and the third element is supported by the constant-speed driven shaft in a relatively rotatable manner with respect thereto.

In the thus configured conventional continuously variable transmission, the rotational power to be transmitted to the first element is first transmitted from the driving shaft to the variable-speed driven shaft that is separate from the constant-speed driven shaft, and is then transmitted to the first element through the variable-speed gear, while the rotational power to be transmitted to the second element is transmitted from the driving shaft through the constant-speed driven shaft.

That is, in the conventional continuously variable transmission, a variable-speed power transmitting path and a constant-speed power transmitting path are totally separate from each other, resulting in a problem of enlargement of the overall power transmitting path and a problem of deterioration of workability in forming the power transmitting path.

SUMMARY OF THE INVENTION

In view of the prior art, it is a first object of the present invention to provide a continuously variable transmission in which a variable-speed rotational power transmitted through a belt type variable speed-change mechanism and a constant-speed rotational power transmitted through an endless member type power-transmitting mechanism are combined by a planetary gear mechanism and the combined rotational power is output therefrom, the continuously variable transmission capable of downsizing an overall power transmitting path and enhancing workability in forming the power transmitting path.

It is a second object of the present invention to provide a working vehicle including the continuously variable transmission.

In order to achieve the object, the present invention provides a continuously variable transmission including a driving shaft and a driven shaft, a casing that supports the driving shaft and the driven shaft so as to be substantially parallel to each other and be rotatable around respective axis lines while allowing the driving shaft to be operatively connected to a driving power source, a belt type variable speed-change mechanism that is accommodated in the casing and that transmits a rotational power from the driving shaft to the driven shaft in a state capable of continuously varying a rotational speed of the rotational power to be transmitted to the driven shaft, a constant-speed power-transmitting mechanism that is accommodated in the casing and that transmits the rotational power at a constant-speed from the driving shaft to a constant-speed driven-side rotational body supported by the driven shaft in a relatively rotatable manner with respect thereto, and a planetary gear mechanism that is supported by the driven shaft in the casing and that includes a first element receiving a variable-speed rotational power through the driven shaft, a second element receiving a constant-speed rotational power through the constant-speed driven-side rotational body and a third element outputting a rotational power made by combining the rotational power of the first and second elements.

The thus configured continuously variable transmission makes it possible to cause a variable-speed rotational power transmitting path that extends from the driving power source to the first element of the planetary gear mechanism and a constant-speed rotational power transmitting path that extends from the driving power source to the second element of the planetary gear mechanism to be common to each other as much as possible, thereby downsizing the power transmitting path as a whole In a preferable configuration, the casing may be detachably mounted to a fixed construction and have an access opening that allows the third element to output the rotational power in a state where the casing is mounted to the fixed construction.

The preferable configuration makes it possible to form the power transmitting path only by mounting the continuously variable transmission to the fixed construction such as an axle case and then operatively connecting the driving shaft to the driving power source, thereby enhancing workability in forming the power transmitting path.

In a preferable configuration, the casing is configured so as to have an accommodation space that is divided in a liquid-tight manner into a first chamber for accommodating the belt type variable speed-change mechanism and a second chamber for accommodating the constant-speed power transmitting mechanism and the planetary gear mechanism.

In one embodiment, the first to third elements are embodied by a sun gear, a carrier and an internal gear, respectively.

In this case, the sun gear is supported on the driven shaft in a relatively non-rotatable manner with respect thereto, and the carrier is supported by the constant-speed driven-side rotational body while supporting a planetary gear in a rotatable manner around the axis line, the planetary gear being revolved around the sun gear.

Furthermore, the present invention provides a working vehicle including a driving power source, an axle unit and the continuously variable transmission according to any one of the above-mentioned configurations, the axle unit including an axle input shaft, paired right and left driving axles, a differential gear device capable of transmitting the rotational power that has been input from the axle input shaft to the paired driving axles in a differential manner to each other, and an axle case that supports the axle input shaft and the paired driving shafts and that accommodates the differential gear device.

In the working vehicle, the internal gear is provided with output teeth for outputting the rotational power. The casing is detachably connected to the axle case that functions as the fixed construction. The output teeth of the internal gear engage with a gear provided at the axle input shaft through the access opening in a state where the easing is connected to the axle case.

In one embodiment, the casing is mounted to the axle case in such a manner as that an arrangement direction of the driving shaft and the driven shaft is along the driving axles.

In this case, the working vehicle further includes right and left supporting stays arranged on both sides of a portion of the axle case that accommodates the differential gear device with respect to the axis line of the paired driving axles.

The supporting stay has a bearing portion that is provided at a proximal end portion and into which the corresponding driving axle is inserted in a rotatable manner around the axis line, and directly or indirectly supports the casing in a state where it is supported by the corresponding driving axle through the supporting stay.

BRIEF DESCRIPTION OF THE DRAWINGS

The above, and other objects, features and advantages of the present invention will become apparent from the detailed description thereof in conjunction with the accompanying drawings therein.

FIG. 8 is a cross sectional view taken along line VIII-VIII in FIG. 7.

FIG. 9 is a cross sectional view taken along line IX-IX in FIG. 8.

FIG. 10 is a cross sectional view of a first modified example of a differential gear device provided in the working vehicle.

FIGS. 11A and 11B are a partial plan view and a partial side view of a first modified example of a pressing mechanism provided in the differential gear device shown in FIG. 11, respectively.

FIGS. 12A and 12B are partial plan views of the pressing mechanism according to the first modified example, and show a state in which both an operating-side arm and an operated-side arm are disposed at a free-wheel position and a state in which only the operating-side arm is moved from the free-wheel position to a differential position while the operated-side arm remains at the free-wheel position, respectively.

FIGS. 14A and 14B are partial plan views of the pressing mechanism according to the second modified example, and show a state in which both the operating-side arm and the operated-side arm are disposed at the differential position and a state in which both the arms are disposed at the free-wheel position, respectively.

FIGS. 16A to 16C are partial plan views of the pressing mechanism according to the second modified example, and show a state in which both the operating-side arm and the operated-side arm are disposed at the differential position, a state in which only the operating-side arm is moved from the differential position to the differential-lock position, and a state in which the operated-side is also moved from the differential position to the differential-lock position, respectively.

FIG. 17 is a cross sectional view of a second modified example of the differential gear device.

DETAILED DESCRIPTION OF THE PREFERRED EMBODIMENTS

First Embodiment

Hereinafter, one embodiment of a continuously variable transmission according to the present invention will be explained, with reference to the attached drawings.

The continuously variable transmission according to the present embodiment is interposed within a traveling system power transmitting path in a working vehicle 1.

First, an overall configuration of the working vehicle 1 to which the continuously variable transmission is applied is explained.

Figure 1:
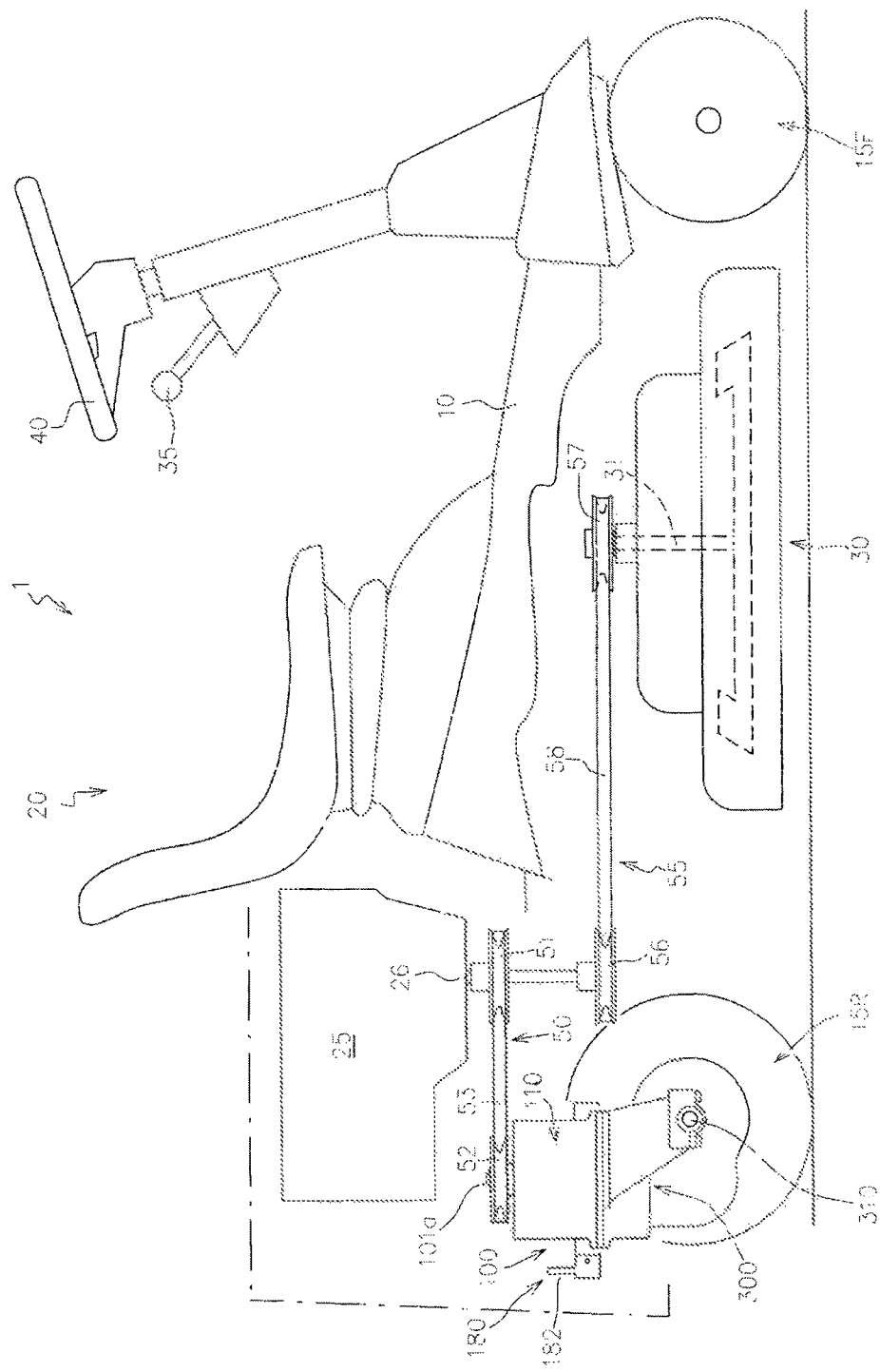
FIG. 1 is a side view of a working vehicle to which a continuously variable transmission according to a first embodiment of the present invention is applied.

FIG. 1 is a side view of the working vehicle 1.

As shown in FIG. 1, the working vehicle 1 is embodied by a riding lawn mower.

More specifically the working vehicle 1 includes a vehicle frame 10, front and rear wheels 15F, 15R supported by the vehicle frame 10, a driver's seat 20 supported by the vehicle frame 10, a driving power source 25 supported by the vehicle frame 10, the continuously variable transmission 100 that is interposed within the traveling system power transmitting path extending from the driving power source 25 to one of the front and rear wheels 15F, 15R that function as a driving wheel, a working machine 30 such as a mower device or the like supported by the vehicle frame 10 in a state of being operatively driven by a rotational power from the driving power source 25, a speed-change operating member 35 arranged in the vicinity of the driver's seat 20, and a steering member 40 arranged in the vicinity of the driver's seat 20.

As shown in FIG. 1, in the working vehicle 1, the rear wheels 15R function as the driving wheel.

Accordingly, the continuously variable transmission 100 is interposed in the travelling system power transmitting path extending from the driving power source 25 to the rear wheels 15R.

Figure 2:
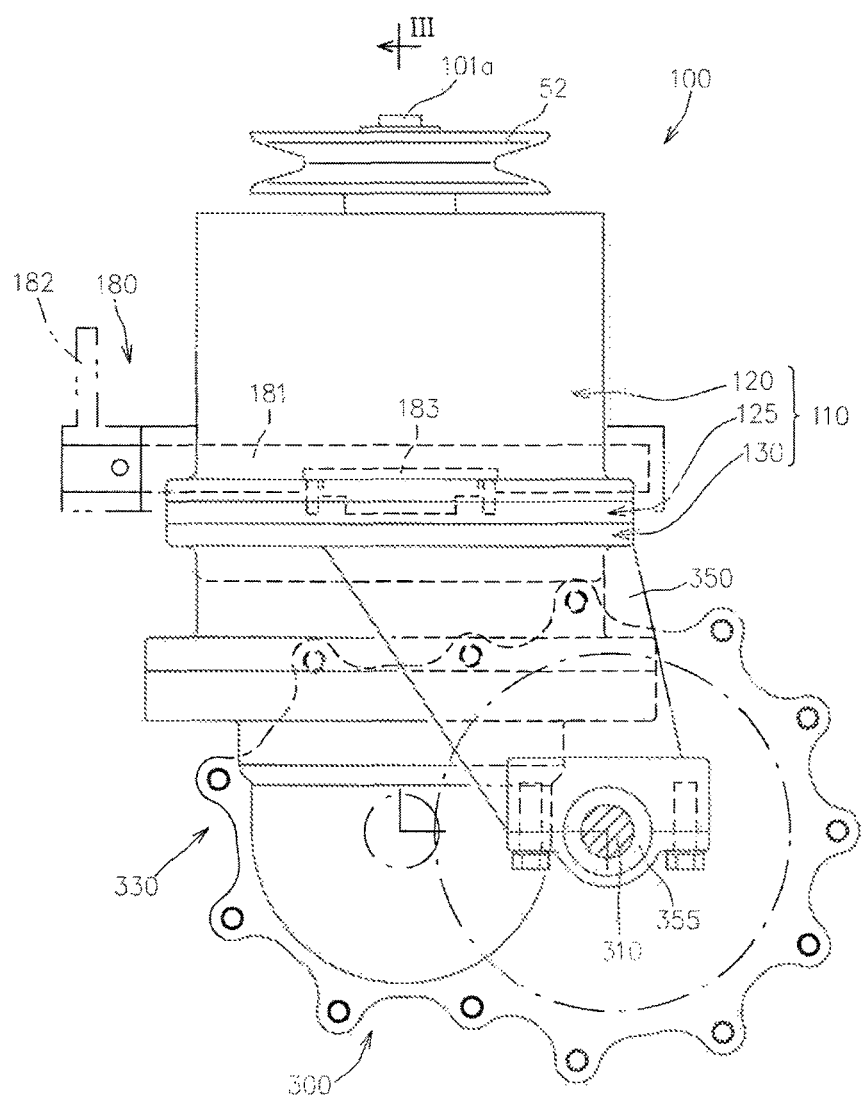
FIG. 2 is an enlarged side view of the continuously variable transmission according to the first embodiment.

FIG. 2 is an enlarged side view of the continuously variable transmission 100.

Figure 3:
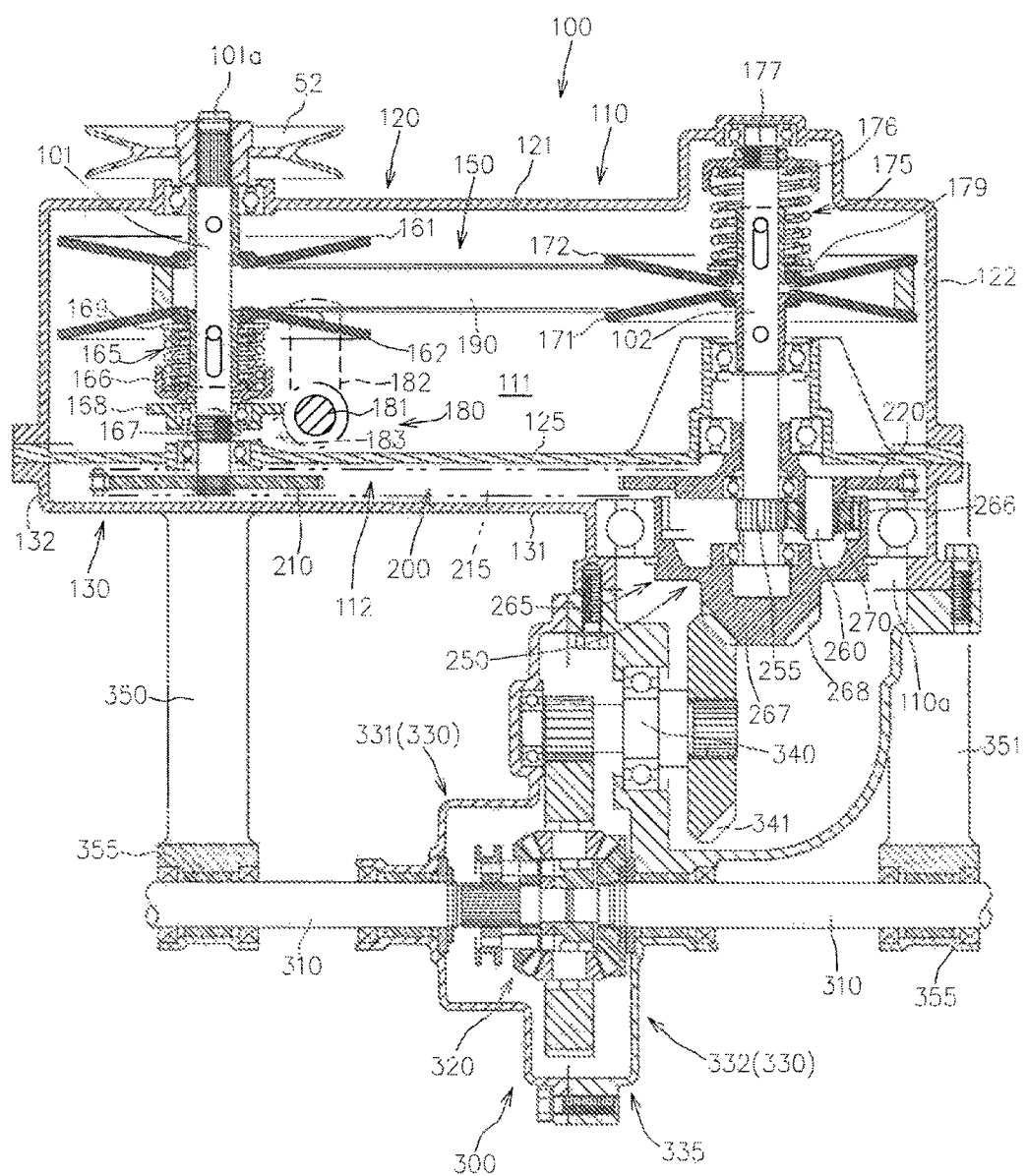
FIG. 3 is a cross sectional view taken along the line III-III in FIG. 2.

FIG. 3 is a cross sectional view taken along the line III-III in FIG. 2.

More specifically, as shown in FIG. 3, the working vehicle 1 includes an axle unit 300 in addition to the above-mentioned components. The axle unit 300 includes paired right and left rear axles 310 that are operatively and respectively connected to the paired right and left rear wheels 15R, a differential gear mechanism 320 that transmits a rotational power to the paired rear axles 310 in a differential manner to each other, and an axle case 330 that supports the paired rear axles 310 and accommodates the differential gear device 320.

In the present embodiment, the axle case 330 includes first and second axle case main bodies 331, 332 that are connected to each other in a separable manner along an axis line direction of the paired rear axles 310.

The continuously variable transmission 100 is interposed between the driving power source 25 and the axle unit 300 with respect to a power-transmitting direction.

As shown in FIG. 3, the continuously variable transmission 100 includes a driving shaft 101, a driven shaft 102, a casing 110 supporting the driving shaft 101 and the driven shaft 102 in a rotatable manner around the respective axis lines, a belt type variable speed-change mechanism 150 accommodated in the casing 110, a constant-speed power-transmitting mechanism 200 and a planetary gear mechanism 250.

The casing 110 supports the driving shaft 101 and the driven shaft 102 so that they are substantially parallel to each other while allowing the driving shaft 101 to be operatively connected to the driving power source 25.

More specifically, the driving shaft 101 is supported by the casing 110 in a rotatable manner around its axis line in a state where its first end extends outward from the casing 110 so as to form an input end portion 101a.

In the present embodiment, as shown in FIG. 3, an upper end portion of the driving shaft 101 extends outward from the casing 110 to form the input end portion 101a.

In the present embodiment, as shown in FIG. 1, the driving power source 25 is of a vertical type that has an output shaft 26 extending vertically. The driving shaft 101 receives a rotational power from the output shaft 26 through a travelling system belt type power-transmitting mechanism 50.

The travelling system belt type power-transmitting mechanism 50 includes a driving-side pulley 51 supported on the output shaft 26 in a relatively non-rotatable manner with respect thereto, a driven-side pulley 52 supported on the input end portion 101a of the driving shaft 101 in a relatively non-rotatable manner with respect thereto, and an endless member 53 wound between the driving-side pulley 51 and the driven-side pulley 52.

As shown in FIG. 1, the output shaft 26 is also operatively connected to the working machine 30 through a working system belt type power-transmitting mechanism 55.

The working system belt type power-transmitting mechanism 55 includes a driving-side pulley 56 supported on the output shaft 26 in a relatively non-rotatable manner with respect thereto, a driven-side pulley 57 supported by an input shaft 31 of the working machine 30 in a relatively non-rotatable manner with respect thereto, and an endless member 58 wound between the driving-side pulley 56 and the driven-side pulley 57.

The belt type variable speed-change mechanism 150 is configured so as to transmit the rotational power from the driving shaft 101 to the driven shaft 102 while continuously varying the rotational speed of the rotational power to be transmitted to the driven shaft 102.

More specifically, as shown in FIG. 3, the belt type variable speed-change mechanism 150 includes a driving-side fixed pulley sheave 161 and a driving-side movable pulley sheave 162 that form a driving-side pulley, a driving-side biasing member 165 acting on the driving-side movable pulley sheave 162, a driven-side fixed pulley sheave 171 and a driven-side movable pulley sheave 172 that form a driven-side pulley; a driven-side biasing member 175 acting on the driven-side movable pulley sheave 172, a speed-change operating mechanism 180 capable of being manually operated, and an endless member 190 wound around the driving-side pulley and the driven-side pulley.

The driving-side fixed pulley sheave 161 is supported on the driving shaft 101 in a relatively non-rotatable manner with respect thereto and in an axially immovable manner.

The driving-side movable pulley sheave 162 is supported on the driving shaft 101 in a relatively non-rotatable manner with respect thereto and in an axially movable manner only within a predetermined distance while facing the driving-side fixed pulley sheave 161.

The driving-side biasing member 165 presses the driving-side movable pulley sheave 162 toward the driving-side fixed pulley sheave 161.

The driven-side fixed pulley sheave 171 is supported on the driven shaft 102 in a relatively non-rotatable manner with respect thereto and in an axially immovable manner.

The driven-side movable pulley sheave 172 is supported by the driven shaft 102 in a relatively non-rotatable manner with respect thereto and in an axially movable manner only within a predetermined distance while facing the driven-side fixed pulley sheave 171.

The driven-side biasing member 175 presses the driven-side movable pulley sheave 172 toward the driven-side fixed pulley sheave 171, and has a pressing force or a biasing force larger than the driving-side biasing member 165.

The speed-change operating mechanism 180 increases the pressing force of the driving-side biasing member 165 that acts on the driving-side movable pulley sheave 162 in response to an operation from an outside.

In the present embodiment, the driving-side biasing member 165 has a first end portion directly or indirectly engaged with a rear surface (a surface opposite from the driving-side fixed pulley sheave 161) of the driving-side movable pulley sheave 162.

The speed-change operating mechanism 180 operatively engages with a second of the driving-side biasing member 165 so as to compress the driving-side biasing member 165 in response to an operation from an outside.

The continuously variable transmission 100 operates as follows.

Since the driven-side biasing member 175 has the pressing force larger than the driving-side biasing member 165, a distance between the driven-side movable pulley sheave 172 and the driven-side fixed pulley sheave 171 becomes minimum when the speed-change operating mechanism 180 is at an initial state in which no operating force from an outside is applied thereto, so that a distance between the driving-side movable pulley sheave 162 and the driving-side fixed pulley sheave 161 becomes maximum.

At the state, the continuously variable transmission 100 is in a minimum speed state (a state shown in FIG. 3) in which an effective diameter of the driving pulley formed by the driving-side fixed pulley sheave 161 and the driving-side movable pulley sheave 162 becomes smallest while an effective diameter of the driven pulley formed by the driven-side fixed pulley sheave 171 and the driven-side movable pulley sheave 172 becomes largest. The effective diameter is a distance from an axial center of the corresponding shaft to a position on which the endless element 190 runs in the corresponding pulley sheave.

When an operating force is applied from an outside to the speed-change operating mechanism 180 when it is in the initial state, the speed-change operating mechanism 180 increases the pressing force of the driving-side biasing member 165 in accordance with the amount of the operating force. This causes the driving-side movable pulley sheave 162 to move towards the driving-side fixed pulley sheave 161 along the axial direction of the driving shaft 101, so that the effective diameter of the driving pulley becomes larger.

This movement accordingly causes the driven-side movable pulley sheave 172 to move apart from the driven-side fixed pulley sheave 171 along the axial direction of the driven shaft 102, so that the effective diameter of the driven pulley becomes smaller, whereby the rotational speed of the driven shaft 102 being increased.

A portion of the driving shaft 101 in which the driving-side movable pulley sheave 162 moves and a portion of the driven shaft 102 in which the driven-side movable pulley sheave 172 moves are preferably coated with low friction material.

In the present embodiment, as shown in FIG. 3, the driving shaft 101 is provided with a driving-side end cap 166 on a rear side (a side opposite from the driving-side fixed pulley sheave 161) of the driving-side movable pulley sheave 162. A coil spring forming the driving-side biasing member 165 has a first end engaged with the rear side of the driving-side movable pulley sheave 162 and a second end engaged with the driving-side end cap 166.

The driving-side end cap 166 is supported on the driving shaft 101 in a state of being operatively connected to the speed-change operating mechanism 180 in such a manner that the cap 166 is positioned at an initial position in the axial direction when the speed-change operating mechanism 180 applies no pressing force thereto, and is moved to one side in the axial direction that is towards the driving-side fixed pulley sheave 161 as the pressing force by the speed-change operating mechanism 170 increases.

As shown in FIG. 3, the initial position is defined by an adjusting threaded mechanism 167 that is engaged with the driving-side end cap 166 through a pressure plate 168.

In the present embodiment, the first end of the driven-side biasing member 165 engages with the rear side of the driven-side movable pulley sheave 162 via a contacting plate 169 (see FIG. 3) inserted around the driven shaft 101 in an axially movable manner.

Similarly, the driven shaft 102 is provided with a driven-side end cap 176 on a rear side (a side opposite from the driven-side fixed pulley sheave 171) of the driven-side movable pulley sheave 172. A coil spring forming the driven-side biasing member 175 has a first end engaged with the rear side of the driven-side movable pulley sheave 172 and a second end engaged with the driven-side end cap 176.

The driven-side end cap 176 is position-adjustable with respect to the axial line direction of the driven shaft 102 by an adjusting threaded mechanism 177 (see FIG. 3).

That is, a speed reduction ratio at the time when the continuously variable transmission 100 is in the minimum speed state can be set by the driving-side adjusting threaded mechanism 167 and the driven-side adjusting threaded mechanism 177.

In the present embodiment, the first end of the driven-side biasing member 175 engages with the rear side of the driven-side movable pulley sheave 172 via a contacting plate 179 (see FIG. 3) inserted around the driven shaft 102 in an axially movable manner.

As shown in FIGS. 2 and 3, the speed-change operating mechanism 180 includes a speed-change shaft 181, a connecting arm 182 and a fork portion 183. The speed-change shaft 181 is supported by the casing 110 in a rotatable manner around the axis line thereof in a state of extending substantially orthogonal to the driving shaft 101 and having a first end portion extended outward from the casing 110. The connecting arm 182 is supported by the outward-extended portion of the speed-change shaft 181 in a relatively non-rotatable manner with respect thereto. The fork portion 183 compresses the driving-side biasing member 165 in response to the rotation of the speed-change shaft 181 around the axis line.

In the present embodiment, the connecting arm 182 is operatively connected through a suitable mechanical linkage to the speed-change operating member 35 disposed in the vicinity of the driver's seat 20.

In the present embodiment, the fork portion 183 has a free end engaged with a rear side of the pressure plate 168, so that the operating force that is transmitted from the speed-change operating mechanism 180 causes the pressure plate 168 to move to one side (the upper side in FIG. 2) in the axis line direction so as to compress the driving-side biasing member 165 through the driving-side end cap 166.

The speed-change operating mechanism 180 may take various configurations as long as it increases the pressing force generated by the driving-side biasing member 165 in accordance with a manual operation amount on the speed-change operating member 35.

In the present embodiment, as explained earlier, the speed-change operating mechanism 180 is operatively connected to the speed-change operating member 35 through a mechanical linkage. Alternatively, the working vehicle may be provided with a sensor (not shown) that detects an operating amount of the speed-change operating member 35, an actuator (not shown) that actuates the speed-change operating mechanism 180 and a control device (not shown). In this alternative configuration, the control device operates the actuator based on a signal from the sensor.

The constant-speed power-transmitting mechanism 200 is configured to transmit the rotational power at a constant-speed from the driving shaft 101 to a constant-speed driven-side rotational body 220 that is supported on the driven shaft 102 in a relatively rotatable manner with respect thereto.

More specifically, the constant-speed power-transmitting mechanism 200 includes a constant-speed driving-side rotational body 210 supported on the driving shaft 101 in a relatively non-rotatable manner with respect thereto, the constant-speed driven-side rotational body 220, and a power-transmitting member 215 operatively transmitting the rotational power from the constant-speed driving-side rotational body 210 to the constant-speed driven-side rotational body 220.

In the present embodiment, as shown in FIG. 3, the constant-speed power-transmitting mechanism 200 is embodied by an endless member type power-transmitting mechanism.

That is, in the present embodiment, the constant-speed driving-side rotational body 210 and the constant-speed driven-side rotational body 220 have gear portions at respective outer peripheral edges, and the power-transmitting member 215 is embodied by a chain that is wound around the gear portions of the constant-speed driving-side rotational body 210 and the constant-speed driven-side rotational body 220.

Alternatively, the gear portions of the constant-speed driving-side rotational body 210 and the constant-speed driven-side rotational body 220 can be engaged with each other directly or via an idle gear.

In a case where the constant-speed driving-side rotational body 210 and the constant-speed driven-side rotational body 220 are directly engaged with each other, the gear portions thereof function as the power-transmitting member 215.

In a case where the constant-speed driving-side rotational body 210 and the constant-speed driven-side rotational body 220 are engaged with each other via the idle gear, the gear portions thereof and the idle gear function as the power-transmitting member 215.

The planetary gear mechanism 250 is supported on the driven shaft 102.

More specifically, the planetary gear mechanism 250 includes a first element receiving a variable-speed rotational power through the driven shaft 102, a second element receiving a constant-speed rotational power through the constant-speed driven-side rotational body 220, and a third element outputting a combined rotational power of the first and second elements.

In the present embodiment, as shown in FIG. 3, a sun gear 255, a carrier 260 and an internal gear 265 function as the first to third elements, respectively.

Figures 4A, 4B:
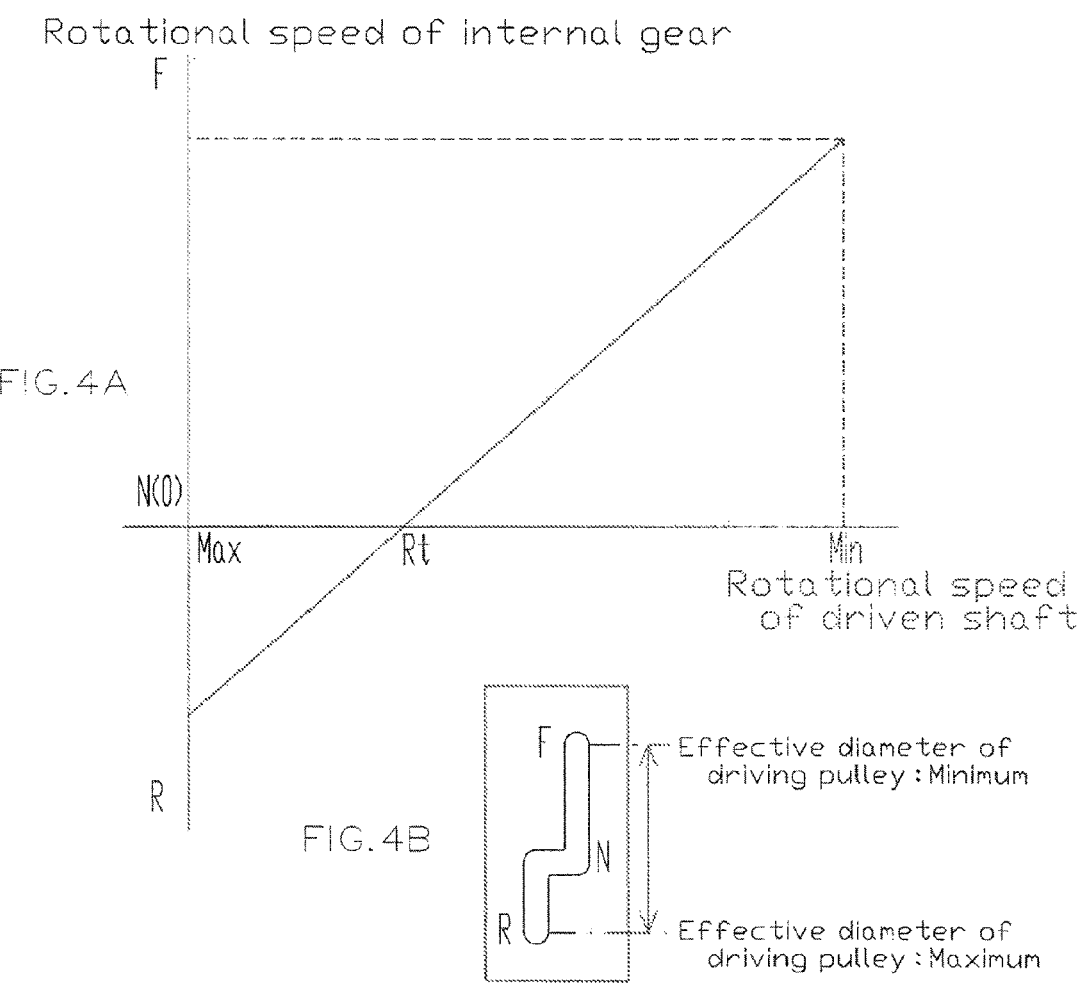
FIG. 4A is a graph showing a relationship between a speed-change condition of a belt type variable speed-change mechanism in the continuously variable transmission according to the first embodiment and a rotational speed of a third element of a planetary gear mechanism in the continuously variable transmission.
FIG. 4B shows a range in which a speed-change operating member can be operated, the member being provided in the working vehicle for performing a speed-change operation of the belt type variable speed-change mechanism.

FIG. 4A is a graph showing a relationship between a speed-change condition of the belt type continuously variable mechanism and a rotational speed of the third element of the planetary gear mechanism.

FIG. 4B shows a range in which the speed-change operating member 35 can be operated.

A gear ratio among the first to third elements is set to satisfy the relationship represented by the graph of FIG. 4A.

More specifically the gear ratio among the first to third elements is set to meet the following conditions in a state where the second element is rotated in one direction at the constant speed.

The rotational speed of the third element becomes a maximum speed in a reverse direction (rearward direction), when the belt type variable speed-change mechanism 150 is in a maximum speed condition (a condition where the speed-change operating member 35 is positioned at a "R" position so that the speed-change operating mechanism 180 causes the driving-side end cap 166 to be moved to a maximum movement position on one side in the axis line direction), that is, when the driven shaft 102 is rotated at a maximum speed "Max", the rotational speed of the third element comes closer to zero from the maximum rotational speed in the reverse direction as the rotational speed of the driven shaft 102 is reduced from the maximum speed "Max", the rotational speed of the third element becomes zero when the rotational speed of the driven shaft 102 reaches a predetermined speed "Rt", the rotational speed of the third element is increased in a normal direction (forward direction) as the rotational speed of the driven shaft 102 is reduced from the speed "Rt", and the rotational speed of the third element becomes a maximum speed in the normal direction when the rotational speed of the driven shaft 102 becomes a minimum speed "Min".

It is possible to set the gear ratio in such a manner as that the rotational speed of the third element; becomes the maximum in the reverse direction when the belt type variable speed-change mechanism 150 is in a state of the minimum speed "Min". However, it is advantageous to realize the reverse rotation of the third element, which is used at a low frequency, when the rotational speed of the output of the belt type variable speed-change mechanism 150 is closer to the maximum speed "Max", which is inefficient in the power transmission.

In the continuously variable transmission 100, the casing 110 is detachably mounted to a fixed construction, and has an access opening 110a that allows the third element to output the rotational power in a state where the casing 110 is mounted to the fixed construction.

In the present embodiment, as shown in FIG. 3, the internal gear 265 functioning as the third element includes a tubular portion 266 and an output portion 267. The tubular portion 266 has internal teeth engaged with the planetary gear 270 while enclosing the same. The output portion 267 extends outward in the axis line direction of the driven shaft 102 from the tubular portion 266, and has output teeth 268 at such a position as to be accessed through the access opening 110a.

In the present embodiment, the axle case 330 of the axle unit 300 is used as the fixed construction.

That is, the casing 110 of the continuously variable transmission 100 is detachably connected to the axle case 330, and the third element can be operatively connected to the differential gear device 320 through the access opening 110a in a state where the casing 110 is connected to the axle case 330.

More specifically, the axle unit 300 includes an axle input shaft 340 in addition to the above-explained components. The axle input shaft 340 is supported by the axle case 330 in a state where a first end extends outward from the axle case 330 and a second end is operatively connected to the differential gear device 320.

As shown in FIG. 3, an outward-extended portion of the axle input shaft 340 is provided with an input gear 341. The casing 110 of the continuously variable transmission 100 is connected to the axle case 330 so that the output teeth 268 of the third element engage with the input gear 341 through the access opening 110a.

As explained above, in the continuously variable transmission 100, the casing that supports the driving shaft 101 and the driven shaft 102 and that accommodates the belt type variable speed-change mechanism 150, the constant-speed power-transmitting mechanism 200 and the planetary gear mechanism 250 is detachably mounted to the fixed construction (the axle case 330 in the present embodiment), the first element of the planetary gear mechanism 250 supported on the driven shaft 102 receives the variable-speed rotational power that is transmitted from the driving shaft 101 to the driven shaft 102 through the belt type variable speed-change mechanism 150. The second element receives the constant-speed rotational power that is transmitted from the driving shaft 101 through the constant-speed power-transmitting mechanism 200 to the constant-speed driven-side rotational body 220 supported on the driven shaft 102 in a relatively rotatable manner with respect thereto. The third element outputs the combined rotational power.

The configuration makes it possible to cause the variable-speed rotational power transmitting path that extends from the driving shaft 25 to the first element and the constant-speed rotational power transmitting path that extends from the driving shaft 101 to the second element to be common to each other as much as possible, thereby downsizing the power transmitting path as a whole.

Furthermore, the casing 110 is provided with the access opening 110a that allows the third element to output the rotational power in a state where the casing 110 is mounted to the fixed construction.

The configuration makes it possible to form the power transmitting path only by mounting the continuously variable transmission 100 to the fixed construction, and then operatively connecting the driving shaft 101 to the driving power source 25, thereby enhancing workability in forming the power transmitting path.

In the present embodiment, as shown in FIG. 3, the casing 110 is mounted to the axle case 330 in such a manner as that an arrangement direction of the driving shaft 101 and the driven shaft 102 (that is, an imaginary line passing the axis lines of the driving shaft 101 and the driven shaft 102 as viewed along the axis lines of the driving shaft 101 and the driven shaft 102) is along the paired rear axles 310.

In this case, as shown in FIG. 3, right and left supporting stays 350, 351 can be arranged on both sides of the axle case 330 in the axis line of the rear axles 310 with a differential gear accommodating portion of the axle case 330 as a reference. The right and left supporting stays 350, 351 directly or indirectly support the casing 110 in a state where their proximal sides are supported by the corresponding rear axles 310.

More specifically, the supporting stays 350, 351 each have on the proximal side a bearing portion in which the rear axle 310 is inserted, and directly or indirectly support the casing 110 in a state where it is supported in a rotatable manner around the axis line by the rear axle 310 that is inserted into the bearing portion 355.

In the present embodiment, as shown in FIG. 3, one supporting 350 of the right and left supporting stays 350, 351 is formed integrally with the casing 110, and the other supporting stay 351 is formed integrally with the axle case 330.

In this case, the other supporting stay 351 is connected to the casing 110 by fastening member such as a bolt.

It is of course possible that both the right and left supporting stays 350, 351 are formed integrally with either one of the casing 110 or the axle case 330, or both stays 350, 351 are separate from the casing 110 and the axle case 330.

In the present embodiment, as shown in FIG. 3, the casing 110 is configured so that an accommodating space is divided in a liquid-tight manner into a first chamber 111 for accommodating the belt type variable speed-change mechanism 150 and a second chamber 112 for accommodating the constant-speed power-transmitting mechanism 200 and the planetary gear mechanism 250.

The configuration makes it possible to lubricate the constant-speed power-transmitting mechanism 200 and the planetary gear mechanism 250 with lubricating oil while preventing the belt type variable speed-change mechanism 150 from being affected by the lubricating oil.

More specifically, as shown in FIG. 3, the casing 110 includes upper and lower casing bodies 120, 130 that are connected to each other in a detachable manner along the axis line of the driving shaft 101 and the driven shaft 102 in a state where a partition member 125 is sandwiched between the upper and lower casing bodies 120, 130.

The upper casing body 120 includes an upper wall 121 and a peripheral wall 122 extending downward from a peripheral edge of the upper wall 121, and is formed with an opening opened downward.

The lower casing body 130 includes a lower wall 131 and a peripheral wall 132 extending upward from a peripheral edge of the lower wall 131, and is formed with an opening opened upward.

The lower wall 131 is formed with the access opening 110a.

The upper and lower casing bodies 120, 130 are connected to each other in a detachable manner along the axis line in a state where the partition member 125 is sandwiched between the casing bodies 120, 130 so that the respective openings are sealed by the partition member 125.

That is, the upper casing body 120 and the partition member 125 form the first chamber 111, while the lower casing body 130 and the partition member 125 form the second chamber 112.

As shown FIG. 3, the driving shaft 101 is supported by the upper wall 121 and the partition member 125 in a rotatable manner around the axis line in a state where the upper end portion extends upward from the upper wall 121 to form the input end portion 101a and the lower end portion passes through the partition member 125 to project into the second chamber 112.

The driven shaft 102 is supported by the upper wall 121 and the partition member 125 in a rotatable manner around the axis line in a state where the lower end portion passes through the partition member 125 to project into the second chamber 112.

Preferably; the axle case 330 is configured so as to form an oil chamber along with the second chamber 112 in a state where the casing 110 is connected to the axle case 330.

The configuration makes it possible to lubricate the differential gear device 320, the planetary gear mechanism 250 and the constant-speed power-transmitting mechanism 200 with the lubricating oil stored in the axle case 330.

Second Embodiment

Hereinafter, another embodiment of the continuously variable transmission according to the present invention will be explained, with reference to the attached drawings.

Figure 5:
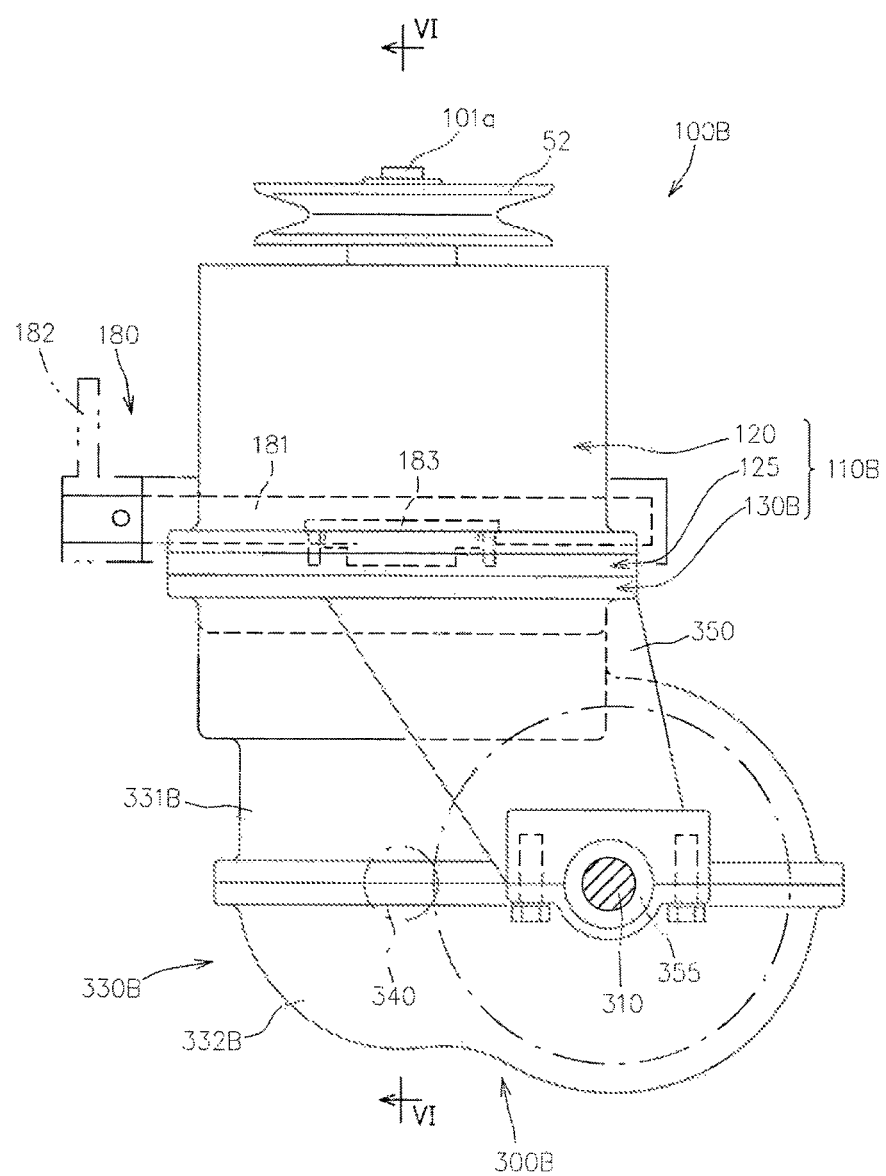
FIG. 5 is an enlarged side view of a continuously variable transmission according to a second embodiment of the present embodiment.

FIG. 5 is an enlarged side view of the continuously variable transmission 100B according to the present embodiment.

Figure 6:
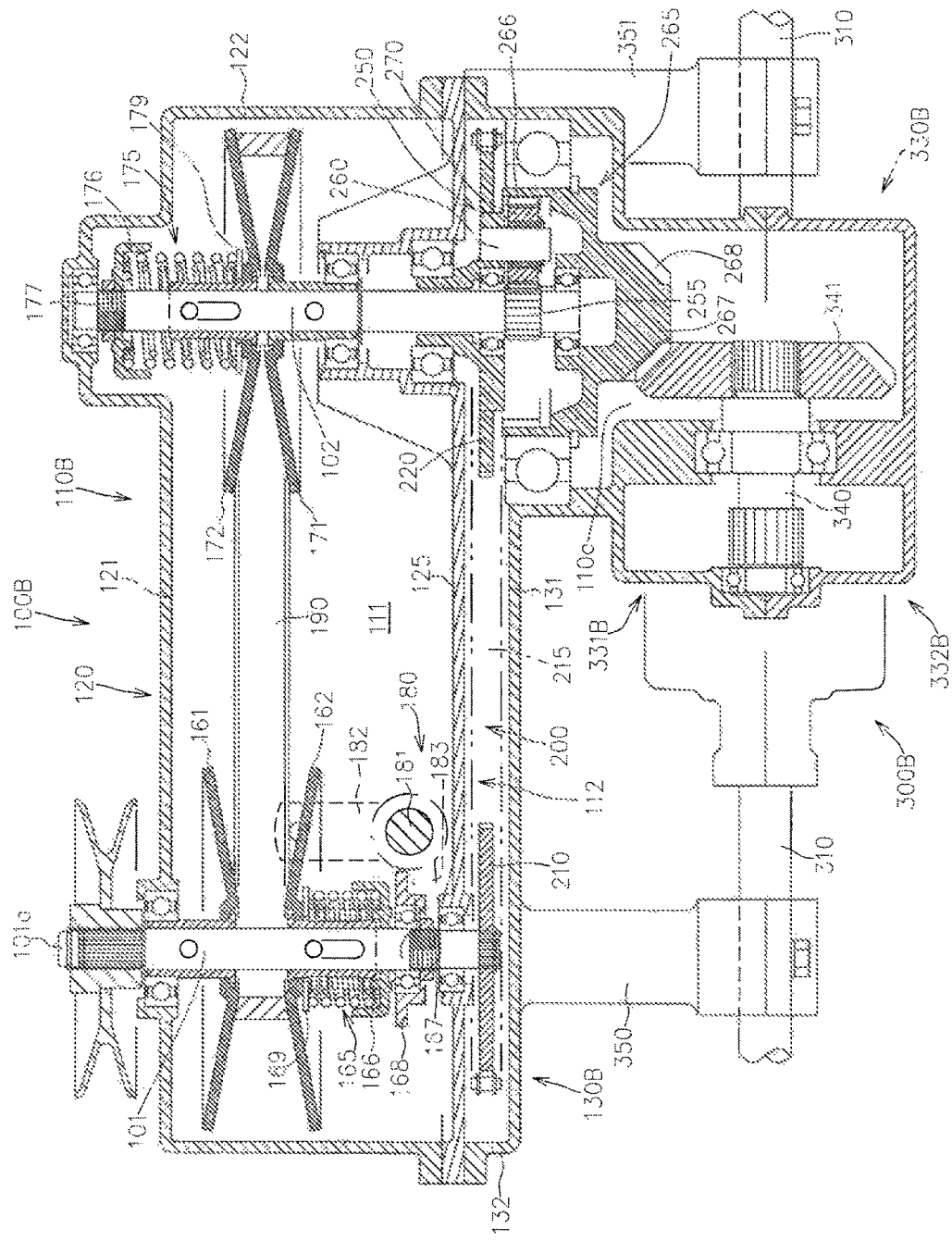
FIG. 6 is a cross sectional view taken along the line VI-VI in FIG. 5.

FIG. 6 is a cross sectional view taken along the line VI-VI in FIG. 5.

In the drawings, the same reference numerals are denoted for the same components as those of the first embodiment to omit the detailed explanation thereof.

The continuously variable transmission 100B according to the present embodiment is different from the continuously variable transmission 100 according to the first embodiment in that a casing 110B integrally includes a part of an axle case 330B functioning as the fixed construction.

More specifically, the continuously variable transmission 100B according to the present embodiment includes the casing 110B in place of the casing 110 in comparison with the continuously variable transmission 100 according to the first embodiment.

As shown in FIGS. 5 and 6, the casing 110B has the substantially same configuration as the casing 110 except that the lower casing body 130 is replaced with a lower casing body 130B.

That is, the casing 100B includes the upper casing body 120, the partition member 125, and the lower casing body 130B.

The lower casing body 130B includes the lower wall 131, the peripheral wall 132, and an upper axle case body 331B integrally formed with the lower wall 131.

More specifically, the continuously variable transmission 100B according to the present embodiment cooperates with an axle unit 300B.

As shown in FIG. 6, the axle unit 300B has the substantially same configuration as the axle unit 300 except that the axle case 330 is replaced with the axle case 330B.

The axle case 330B includes the upper axle case body 331B and a lower axle case body 332B that are connected to each other in a detachable manner along a vertical direction.

The upper axle case body 331b is integrally formed with the lower wall 131 of the lower casing body 130B.

In the present embodiment, the right and left supporting stays 350, 351 are also integrally formed with the lower casing body 130B.

Third Embodiment

Hereinafter, still another embodiment of the continuously variable transmission according to the present invention will be explained, with reference to the attached drawings.

Figure 7:
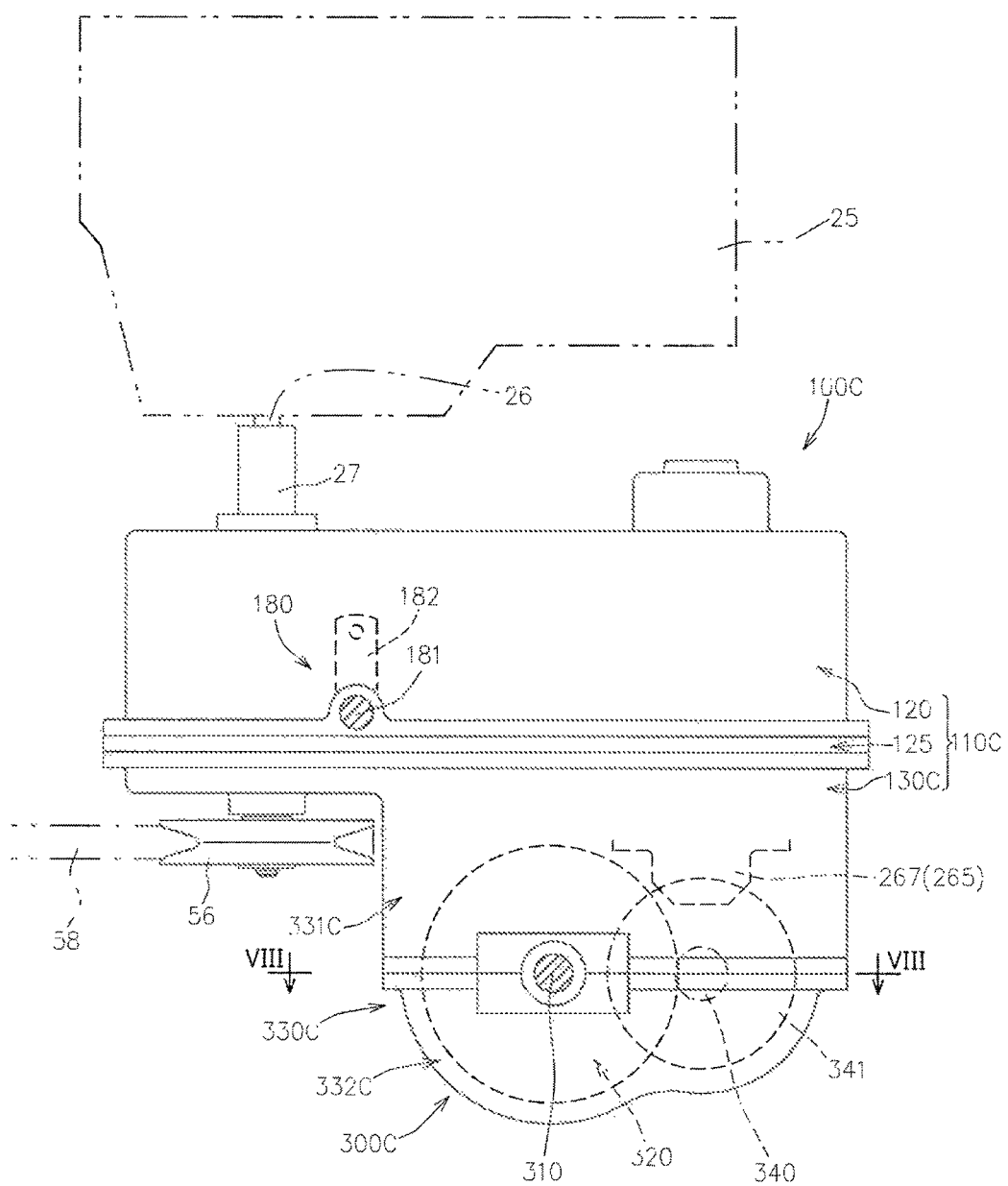
FIG. 7 is an enlarged side view of a continuously variable transmission according to a third embodiment of the present embodiment.

FIG. 7 is an enlarged side view of the continuously variable transmission 100C according to the present embodiment.

FIG. 8 is a cross sectional view taken along the line VIII-VIII in FIG. 7.

FIG. 9 is a cross sectional view taken along the line IX-IX in FIG. 8.

In the drawings, the same reference numerals are denoted for the same components as those of the first and second embodiments to omit the detailed explanation thereof.

As shown in FIG. 8, the continuously variable transmission 100C according to the present embodiment is different from the continuously variable transmissions 100, 100B according to the first and second embodiments in that it is connected to an axle case 330C functioning as the fixed construction in such a manner as that the arrangement direction of the driving shaft 101 and the driven shaft 102 (that is, an imaginary line (IL in FIG. 8) passing the axis lines (AL in FIG. 8) of the driving shaft 101 and the driven shaft 102 as viewed along the axis lines of the driving shaft 101 and the driven shaft 102) intersects with the axis line of the paired rear axles 310.

More specifically, the continuously variable transmission 100C includes a casing 110C in place of the casings 110, 110B in comparison with the continuously variable transmissions 100, 100B according to the first and second embodiments.

As shown in FIG. 7, the casing 110C includes the upper casing body 120, the partition member 125, and a lower casing body 130C that is connected to the upper casing body 120 in a detachable manner along the axis line of the driving shaft 101 and the driven shaft 102 in a state where the partition member 125 is sandwiched between the lower casing body 130C and the upper casing body 120.

The lower casing body 130C includes a lower wall 131C and a peripheral wall 132C extending upward from a peripheral edge of the lower wall 131C, and is formed with an opening opened upward.

The lower wall 131C is formed with the access opening 110a.

In the same manner as the casings 110, 110B, the casing 110C forms the first chamber 111 by the upper casing body 120 and the partition member 125, and also forms the second chamber 112 by the lower casing body 130C and the partition member 125.

As shown in FIG. 9, the driving shaft 101 is supported by the upper wall 121, the partition member 125 and the lower wall 131C in a rotatable manner around the axis line in a state where the upper end portion extends upward from the upper wall 121 to form the input end portion 101a and the lower end portion passes through the lower wall 131C and extends outward.

In the present embodiment, as shown in FIGS. 7 and 9, the upper end portion of the driving shaft 101 is connected to the output shaft 26 of the driving power source 25 via a coupling 27, and the driving-side pulley 56 is supported by the lower end portion of the driving shaft 101 in a relatively non-rotatable manner with respect thereto.

The driven shaft 102 is supported by the upper wall 121 and the partition member 125 in a rotatable manner around the axis line in a state where the lower end portion passes through the partition member 125 to project into the second chamber 112.

The casing 110C integrally includes a part of the axle case 330C, in the same manner as the casing 110B in the second embodiment.

More specifically, the continuously variable transmission 100C according to the present embodiment cooperates with an axle unit 300C.

As shown in FIG. 9, the axle unit 300C has the substantially same configuration as the axle unit 300 except that the axle case 330 is replaced with the axle case 330C.

As shown in FIGS. 7 and 9, the axle case 330C includes an upper axle case body 331C and a lower axle case body 332C that are connected to each other in a detachable manner along the vertical direction.

In the configuration, the upper axle case body 331C is integrally formed with the lower casing body 130C.

Now, a first modified example 500 of the differential gear device 300 is explained.

The differential gear device 300 selectively takes a differential state and a differential-lock state. At the differential state, the differential gear device 300 transmits the rotational power that has received at the input gear to the paired rear axles that function as output shafts in a differential manner to each other in accordance with the respective loads on the paired rear axles. At the differential-lock state, the differential gear device 300 transmits the rotational power to the paired rear axles so that they are forcibly driven at the same speed to each other.

On the other hand, the differential gear device 500 according to the first modified example is configured so as to selectively take the differential state, the differential-lock state, and a freewheel state in which the paired rear axles are freely rotatable with respect to the input gear.

FIG. 10 is a cross sectional view of the differential gear device 500.

The differential gear device 500 is capable of transmitting the rotational power that has received at an input gear 510 to the paired rear axles 310 that function as paired first and second output shafts 310(1), 310(2) in a differential manner to each other.

More specifically, as shown in FIG. 10, the differential gear device 500 includes the input gear 510, supporting shafts 520, bevel pinions 530 and first and second side bevel gears 541, 542. The input gear 510 is rotated around a rotational axis line R by the rotational power that is input thereto. The supporting shaft 520 extends radially with the rotational axis line as a reference and rotates around the rotational axis line R along with the input gear 510. The bevel pinion 530 is supported by the supporting shaft 520 in such a manner as that it revolves around the rotational axis line R in accordance with the rotation of the input gear 510 around the rotational axis line R while rotating around the axis line of the supporting shaft 520. The first and second side bevel gears 541, 542 engage with the bevel pinion 530.

In the differential gear device 500, at least one of the first and second side bevel gears 541, 542 is relatively rotatable with respect the corresponding one of the first and second output shafts 310(1), 310(2).

In the first modified example, the first side bevel gear 541 is relatively rotatable with respect to the corresponding first output shaft 310(1), while the second bevel gear 542 is relatively non-rotatable with respect to the corresponding second output shaft 310(2).

As shown in FIG. 10, in the first modified example, the first and second side bevel gears 541, 542 are directly supported by the respective corresponding first and second output shafts 310(1), 310(2).

That is, the first side bevel gear 541 is supported on the first output shaft 310(1) in a relatively rotatable manner with respect thereto, while the second side bevel gear 542 is supported on the second output shaft 310(2) in a relatively non-rotatable manner with respect thereto.

As shown in FIG. 10, the differential gear device 500 further includes a single switching slider 550 supported on one (the first output shaft 310(1) in the first modified example) of the output shafts to which the corresponding side bevel gear 541 is relatively rotatable.

The switching slider 550 is supported by the corresponding output shaft (the first output shaft 310(1) in the first modified example) in a relatively non-rotatable manner around the axis line and an axially movable manner with respect thereto and selectively takes a differential-lock position, a differential position and a free-wheel position with respect to a position in the axis line direction in accordance with an operation from an outside. At the differential-lock position, the switching slider 550 causes the corresponding first output shaft 310(1) to be relatively non-rotatable with respect to the input gear 510. At the differential position, the switching slider 550 causes the corresponding first output shaft 310(1) to be relatively rotatable with respect to the input gear 501 and be relatively non-rotatable with respect to the corresponding first side bevel gear 541. At the free-wheel position, the switching slider 550 causes the corresponding first output shaft 310(1) to be relatively rotatable with respect to both the input gear 510 and the corresponding first side bevel gear 541.

In the first modified example, as shown in FIG. 10, the first output shaft 310(1) is formed with spline 311a on an outer circumferential surface at an inner end portion. The switching slider 550 engages with the spline 311a so as to be relatively non-rotatable while being axially movable with respect to the first output shaft 310(1).

FIG. 10 shows, on an upper side of the first output shaft 310(1), a state in which the switching slider 55 is disposed at the differential-lock position, and also shows, on a lower side of the first output shaft 310(1), a state in which the switching slider 55 is disposed at the free-wheel position.

As described above, the differential gear device 500 according to the first modified example makes it possible to realize a deferential state in which the rotational power that the input gear 510 has received is transmitted to the first and second output shafts 310(1), 310(2) in a differential manner to each other in accordance with a difference between the loads applied on the first and second output shafts 310(1), 310(2) by having the switching slider 550 disposed at the differential position and a differential-lock state in which the rotational power that the input gear 510 has received is transmitted to the first and second output shafts 310(1), 310(2) so that the both output shafts 310(1), 310(2) are rotated at the same speed to each other regardless of the difference between the loads applied on the first and second output shafts 310(1), 310(2) by having the switching slider 550 disposed at the differential-lock position, and, in addition to the two states, also realize a free-wheel state in which the power transmission from the input gear 510 to the first and second output shafts 310(1), 310(2) is shut off by having the switching slider 550 disposed at the free-wheel position.

Accordingly, the rotation of the driving wheel at the time of traction of the working vehicle 1 can be prevented from being transmitted to an upstream side of the differential gear device 500 by disposing the switching slider 550 at the free-wheel position, whereby the traction of the working vehicle 1 can be easily performed in a case where the working vehicle 1 is needed to be forcibly towed due to, for example, failure of the driving power source 25 and the continuously variable transmission 100.

In particular, the effect is useful in a case where the rotational power that is operatively transmitted from the driving power source 25 to the input gear 510 through a worm gear.

More specifically, a free-wheel state of the driving wheel can be realized by providing a clutch configuration in any part of a traveling system power transmitting path from the power driving source to the driving wheel. That is, the continuously variable transmission 100 can be provided with the clutch configuration or an independent device including the clutch configuration can be arranged in the traveling system power transmitting path so that the free-wheel state of the driving wheel is realized by cutting off the power transmission from the driving power source to the driving wheel by the clutch configuration.

However, in a case where the rotational power is operatively transmitted from the driving power source 25 to the input gear 510 through the worm gear, the worm gear would be a huge resistance at the time of forcible traction of the working vehicle 1 unless any kind of cutch configuration is arranged on a downstream side of the differential gear device 500 in the power-transmitting direction.

In other words, in a case where the clutch configuration is arranged on an upstream side of the differential gear device 500 in the power-transmitting direction, even if the power transmission in the traveling system power transmitting path is cut off, the worm gear has to be rotated by a forcible rotation of the driving wheel for forcibly towing the working vehicle.

Further, an arrangement of the clutch configuration on a downstream side of the differential gear device 500 is disadvantage in view of layout and cost.

On the other hand, the differential gear device 500 makes it possible to cut off the power transmission from the input gear 510 to the first and second output shafts 310(1), 310(2).

Even if the input gear 510 operatively receives the rotational power from the driving power source 25 through the worm gear, it is possible to prevent the worm gear from being resistant to the forcible traction of the working vehicle 1.

In the first modified example, as shown in FIG. 10, the input gear 510 is embodied by a ring gear so that the differential gear device 500 can be downsized as a whole.

More specifically, the input gear 510 is formed into a ring-shape, and includes a supporting hole 511 arranged coaxially with the rotational axis line R and installation holes 512 arranged radially outward of the supporting hole 511 with respect to the rotational axis line R.

The supporting hole 511 supports inner end portions of the first and second output shafts 310(1), 310(2).

The installation hole 512 is opened to both sides in the rotational axis line R and forms an installation space for the supporting shaft 520 and the bevel pinion 530.

The supporting shaft 520 is arranged in the installation hole 512 so as to extend along the radial direction with the rotational axis line R as a reference.

The bevel pinion 530 is supported by the supporting shaft 520 arranged in the installation hole 512 so as to be accessible from both sides in the rotational axis line.

The first side bevel gear 541 is supported by the first output shaft 310(1) so as to be positioned on a first side of the supporting shaft 520 in the rotational axis line R and engage with the bevel pinion 530. The second side bevel gear 542 is supported by the second output shaft 310(2) so as to be positioned on a second side, which is opposite from the first side, of the supporting shaft 520 in the rotational axis line R and engage with the bevel pinion 530.

The switching slider 550 is supported by the first output shaft 310(1) so as to be positioned on the first side of the first side bevel gear 530 in the rotational axis line R.

The switching slider 550 is provided with an engage pin 551 that extends toward the second side in the rotational axis line R. The first side bevel gear 541 is provided with a through hole 545 that extend through in the rotational axis line R so that the engage pin 551 can be passed through. The input gear 510 is provided with an engagement concave portion 515 that is opened toward the first side in the rotational axis line R so that the engagement pin 551 can be inserted into.

In the configuration, when the switching slider 550 is disposed at the differential-lock position, the engagement pin 551 passes through the through hole 545 and is engaged into the engagement concave portion 515 at an distal end (a state shown on an upper side of the first output shaft 310(1) in FIG. 10), so that the first output shaft 310(1) is relatively non rotatable with respect to both the input gear 510 and the first side bevel gear 541.

When the switching slider 550 is disposed at the differential position, the engagement pin 551 is inserted into the through hole 545 but is not engaged into the engagement concave portion 515, so that the first output shaft 310(1) is relatively rotatable with respect to the input gear 510 but is relatively non-rotatable with respect to the first side bevel gear 541.

When the switching slider 550 is disposed at the free-wheel position, the engagement pin 551 is not inserted into the through hole 545 (a state shown on a lower side of the first output shaft 310(1) in FIG. 10), so that the first output shaft 310(1) is relatively rotatable with respect to both the input gear 510 and the first side bevel gear 541.

The differential gear device 500 further includes a pressing mechanism 600 that moves the switching slider 550 in response to an operational force from an outside.

The pressing mechanism 600 includes a shifter fork shaft 610 having a shaft portion 611 and a fork portion 612.

The shaft portion 611 is supported by the housing 51 in a rotatable manner around the axis line in a state that it extends a direction orthogonal to the rotational axis line R and at least one end portion thereof extends outward.

The fork portion 612 extends from the shaft portion 611 so as to engage with the switching slider 550.

The shifter fork shaft 610 is configured so that a rotation of the shaft portion 611 toward a first direction around the axis line causes the fork portion 612 to press the switching slider 550 toward an engagement direction in which the switching slider 550 moves from the free-wheel position to the differential position or from the differential position to the differential-lock position and a rotation of the shaft portion 611 toward a second direction, which is opposite from the first position, around the axis line causes the fork portion 612 to press the switching slider 550 toward a release direction in which the switching slider 550 moves from the differential-lock position to the differential position or from the differential position to the free-wheel position.

That is, when the shaft portion 611 is rotated toward the first direction around the axis line in a state where the switching slider 550 is disposed at the differential position, for example, the fork portion 612 presses the switching slider 550 toward the engagement direction so that the switching slider 550 is moved to the differential-lock position.

On the other hand, when the shaft portion 611 is rotated toward the second direction around the axis line in a state where the switching slider 550 is disposed at the differential position, the fork portion 612 presses the switching slider 550 toward the release direction so that the switching slider 550 is moved to the free-wheel position.

As shown in FIG. 10, the pressing mechanism 600 further includes an operated-side arm 620 supported by a part of the shaft portion 611 that extends outward from the housing 51.

The operated-side arm 620 is operatively connected through a suitable linkage mechanism to a differential switching operation member (not shown) in the vicinity of the driver's seat 20.

In a preferable configuration, the pressing mechanism 600 may be further provided with an operating-side arm 630 and a spring member 640. The operating-side arm 630 is separate from the operated-side arm 620 and receives the operating force from the differential switching operation member. The spring member 640 transmits a movement of the operating side arm 630 to the operated-side arm 620.

FIGS. 11A and 11B are a partial plan view and a partial side view of a pressing mechanism 600B according to a first modified example that includes the operating-side arm 630 and the spring member 640 in addition to the shifter fork shaft 610 and the operated-side arm 620.

As shown in FIGS. 11A and 11B, the operated-side arm 620 has a proximal end portion supported by the shaft portion 611 of the shifter fork shaft 610 in a relatively non-rotatable manner with respect thereto, and extends radially outward with the shaft portion 611 as a reference.

The operated-side arm 620 is provided with an operated-side pin 621 that extends substantially parallel to the shaft portion 611.

The operating-side arm 630 has a proximal end portion supported by the shaft portion 611 of the shifter fork shaft 610 in a relatively rotatable manner with respect thereto, and extends radially outward with the shaft portion 611 as a reference so as to face the operated-side arm 620.

The operating-side arm 630 is provided with an operating-side pin 631 that extends substantially parallel to the shaft portion 611.

The spring member 640 is embodied by a coil spring including a spiral portion 645 and first and second end portions 641, 642. The spiral portion 645 is wound around the shaft portion 611. The first and second end portions 641, 642 extend respectively from one end and the other end of the spiral portion 645 toward a radially outward direction with the shaft portion 611 as a reference. The operating-side pin 631 and the operated-side pin 621 are sandwiched by the first and second end portions 641, 642 of the coil spring.

The pressing mechanism 600B operates as follows.

FIGS. 12A and 12B are partial plan views of the pressing mechanism 600B according to the first modified example.

FIG. 12A shows a state in which both the operating-side arm 630 and the operated-side arm 640 are disposed at the free-wheel position.

FIG. 12B shows a state in which the operated-side arm 620 remains at the free-wheel position and only the operating-side arm 630 is moved to the differential position from the free-wheel position.

First, an explanation is made on a case where the operating-side arm 630 is operated toward the release direction to the free-wheel position from a state in which both the operating-side arm 630 and the operated-side arm 620 are disposed at the differential position (see FIG. 11A).

The movement of the operating-side arm 630 from the differential position to the free-wheel position is transmitted through the spring member 640 to the operated-side arm 620 so that the operated-side arm 620 is also moved from the differential position to the free-wheel position (see FIG. 12A).

The movement of the operated-side arm 620 from the differential position to the free-wheel position causes the switching slider 550 to move from the differential position to the free-wheel position so that the engagement pin 551 is pulled out of the through hole 545 of the first side bevel gear 541 (free-wheel state).

Next, an explanation is made on a case where the operating-side arm 630 is operated toward the engagement direction to the differential position from a state in which both the operating-side arm 630 and the operated-side arm 620 are disposed at the free-wheel position (see FIG. 12A).

The movement causes the engagement pin 551 of the switching slider 550 to be inserted into the through hole 545 of the first side bevel gear 541. However, if the engagement pin 551 is displaced from the through hole in a circumferential direction, a situation may arise such as where the engagement pin 551 cannot be readily inserted into the through hole 541.

If such a situation arises, only the operating-side arm 630 is moved from the free-wheel position to the differential position in accordance with the manual operation on the differential switching operation member in a state where the operated-side arm 620 remains at the free-wheel position. In this situation, the coil spring is elastically deformed so as to have a retained elasticity (see FIG. 12B).

More specifically, the movement of the operating-side arm 630 is transmitted through the spring member 640 to the operated-side arm 620. However, in a case where the engagement pin 551 is brought into contact with an area of the first side bevel gear 541 that is other than the through hole 545, the movement of the operated-side arm 620 from the free-wheel position to the differential position is prohibited.

Accordingly, only the operating-side arm 630 is moved from the free-wheel position to the differential position so that the coil spring that functioning as the spring member 640 is elastically deformed to have a retained elasticity (see FIG. 12B).

In this state, the coil spring keeps pressing the operated-side arm 620 toward the engagement direction (from the free-wheel position to the differential position in this case) by the retained elasticity. Accordingly, at the time when the engagement pin 551 and the through hole 545 agree with each other with respect to the circumferential position, the engagement pin 551 is inserted into the through hole 545 so that the switching slider 500 is moved to the differential position.

As described above, in the pressing mechanism 600B according to the first modified example, the elastic deformation of the spring member 640 can absorb a disagreement of movement between the operating-side arm 630 and the operated-side arm 620, and the retained elasticity of the spring member 640 in accordance with the elastic deformation can cause the operated-side arm 620 (that is, the switching slider 550) to follow the movement of the operating-side arm 630.

In more preferable configuration, as shown in FIG. 11A to FIG. 12B, one (the operating-side arm 630 in the illustrated configuration) of the operating-side arm 630 and the operated-side arm 620 may be provided with a slit 635 into which the pin 621 provided at the other one (the operated-side aroma 620 in the illustrated configuration) is inserted.

The slit 635 extends along the circumferential direction of the shaft portion 611, and has such a length in the circumferential direction as to allow only the operating-side arm 630 to move to a position adjacent to a currently disposed position in a state where the operated-side arm 620 remains at any one of the differential position, the differential-lock position and the free-wheel position around the shaft portion 611 of the shifter fork shaft 610.

The configuration makes it possible to cause the slit 635 and the pin 621 engaged into the slit 635 to function as a guide of the operating-side arm 630 and the operated-side arm 620, thereby enhancing stability of the movement of the operating-side arm 620 and the operated-side arm 630.

As shown in FIG. 11A to FIG. 12B, the pressing mechanism 600B according to the first modified example is preferably provided with a detent mechanism 700 that locks the operating-side arm 630 at the differential position, the differential-lock position and the free-wheel position.

For example, the detent mechanism 700 may include plural detent concave portions 705, a locking member 710 and a biasing member 715. The plural concave portions 705 are arranged at an outer peripheral edge of the operating-side arm 630 so as to be along the circumferential direction of the shaft portion 611. The locking member 710 is capable of engaging with and disengaging from the plural detent concave portions 705. The biasing member 715 presses the locking member 710 toward the detent concave portions 705.

The plural detent concave portions 705 are arranged at such positions as to face the locking member 710 at the time when the operating-side arm 630 is disposed at the free-wheel position, the differential position and the differential-lock position, respectively.

Figure 13:
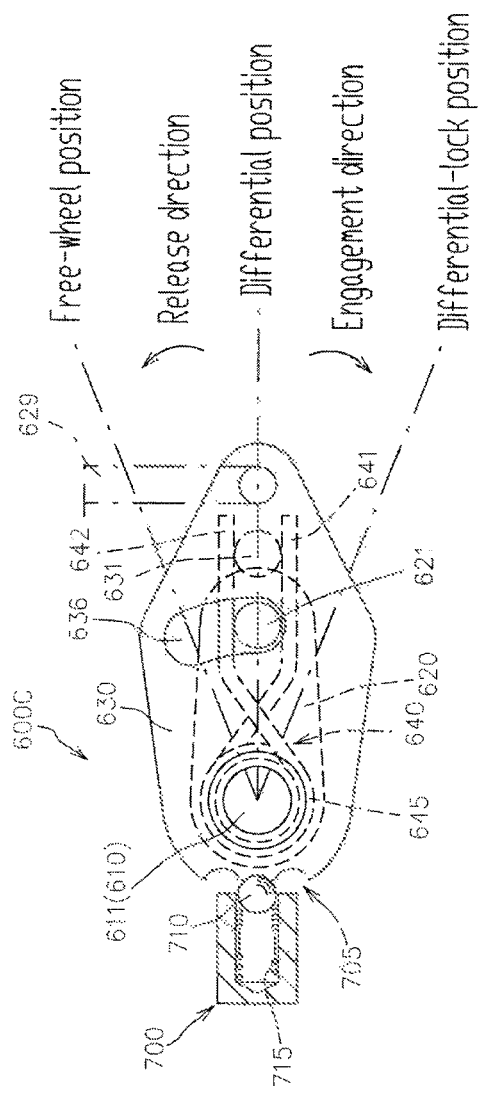
FIG. 13 is a partial plan view of a second modified example of the pressing mechanism.

FIG. 13 is a partial plan view of a pressing mechanism 600C according to a second modified example.

In the drawing, the same reference numerals are denoted for the same components as those of the pressing mechanism 600 and the pressing mechanism 600B according to the first modified example.

As shown in FIG. 13, the pressing mechanism 600C according to the second modified example is different from the pressing mechanism 600B according to the first modified example in that the slit 635 is changed to a slit 636.

The slit 636 is common to the slit 635 in that the engagement pin 621 provided at a remaining arm other than one of the operating-side arm 630 and the operated-side arm 620 in which the slit 636 is formed is inserted into the slit 636 and also in that it is along the circumferential direction of the shaft portion 611, but is different from the slit 635 with respect to the length in the circumferential direction.

More specifically, as shown in FIG. 13, the slit 636 is set to have such a length in the circumferential direction as to allow only the operating-side arm 630 to move to a position adjacent to a currently disposed position without moving the operated-side arm 620 in a case where the operating direction of the operating-side arm 630 is a direction that presses the switching slider 550 toward the engagement direction while causing the operated-side arm 620 to be moved to a position adjacent to a currently disposed position through the engagement pin 621 in accordance with the movement of the operating-side arm 630 in a case where the operating direction of the operating-side arm 630 is a direction that presses the switching slider 550 toward the release direction.

The pressing mechanism 600C according to the second modified example operates as follows.

As shown in FIG. 13, the operating-side arm 630 can be operated around the shaft portion 611 toward the release direction that presses the switching slider 550 toward the release direction and also toward the engagement direction that presses the switching slider 550 toward the engagement direction.

First, an explanation is made on a case where the operating-side arm 630 is operated toward the release direction with reference to FIGS. 14A and 14B.

When the operating-side arm 630 and the operated-side arm 620 are disposed at the same position (the differential position in a case shown in 14A), the engagement pin 621 is engaged with an end portion of the slit 636 that is positioned on an upstream side in the release direction of the operating-side arm 630 (see FIG. 14A).

Accordingly, when the operating-side arm 630 is operated toward the release direction, the end portion of the slit 636 presses the engagement pin 621 so that the operated-side arm 620 is also readily moved toward the release direction (see FIG. 14B).

Next, an explanation is made on a case where the operating-side arm 630 is operated toward the engagement direction with reference to FIGS. 15A to 15C and FIGS. 16A to 16C.

Figure 15A:
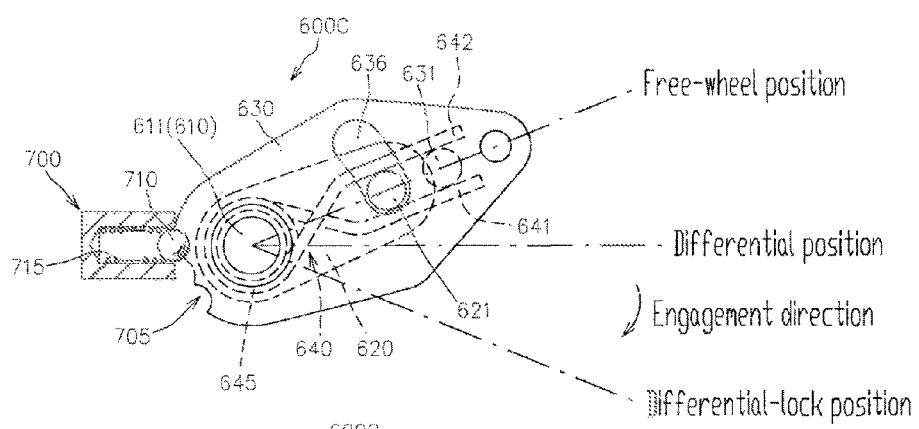
FIGS. 15A to 15C are partial plan views of the pressing mechanism according to the second modified example, and show a state in which both the operating-side arm and the operated-side arm are disposed at the free-wheel position, a state in which only the operating-side arm is moved from the free-wheel position to the differential position, and a state in which the operated-side arm is also moved from the free-wheel position to the differential position, respectively.
Figure 15B:
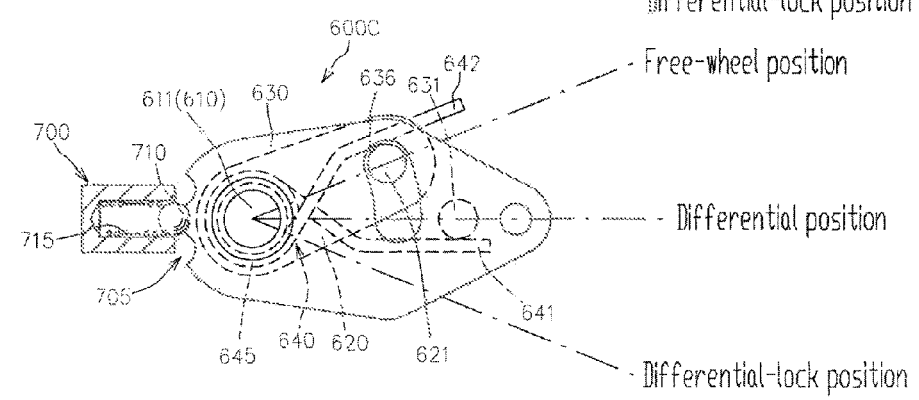
Figure 15C:
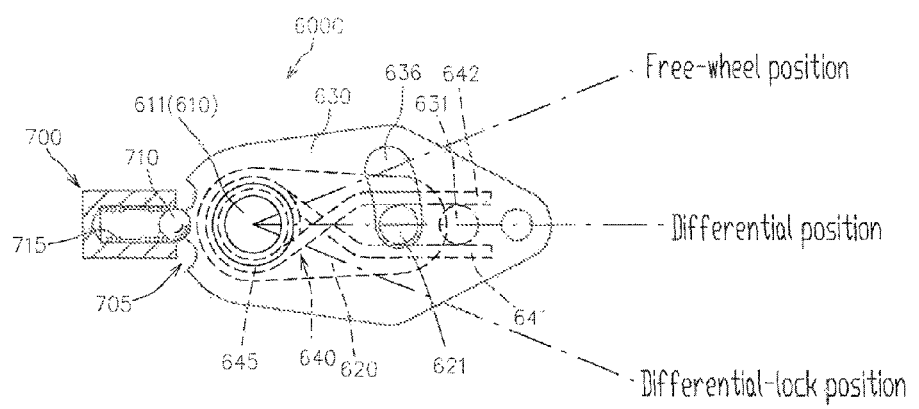

FIGS. 15A to 15C show a case where the operating-side arm 630 is operated to the differential position in a state where both the operating-side arm 630 and the operated-side arm 620 are disposed at the free-wheel position.

FIGS. 16A to 16C show a case where the operating-side arm 630 is operated to the differential-lock position in a state where both the operating-side arm 630 and the operated-side arm 620 are disposed at the differential position.

When the operating-side arm 630 and the operated-side arm 620 are disposed at the same position, the engagement pin 621 is engaged with the end portion of the slit 636 that is positioned on an upstream side in the release direction (that is, an downstream side in the engagement direction) of the operating-side arm 630 (see FIGS. 15A and 16A).

When the operating-side arm 630 is operated toward the engagement direction, the engagement pin 621 moves toward an upstream side in the engagement direction of the operating-side arm 630 in comparison with the slit 636. That is, in this case, the operated-side arm 620 is not pressed toward the engagement direction because of the relative movement of the engagement pin 621 with respect to the slit 636.

On the other hand, since the operating-side pin 631 and the operated-side pin 621 are sandwiched by the first and second end portions 641, 642 of the coil spring 640, the movement of the operating-side arm 630 toward the engagement direction is transmitted through the operating-side pin 631, the coil spring 640 and the operated-side pin 621 to the operated-side arm 620, which cause the operated-side arm 620 to try to move toward the engagement direction.

On this occasion, in a case where the engagement pin 551 of the switching slider 550 is disposed at the same position as the through hole 545 of the first side bevel gear 541 (or the engagement concave portion 515 of the ring gear 551) in the circumferential direction, the engagement pin 551 is readily inserted into the through hole 545 (or the engagement concave portion 515) so that the switching slider 550 is allowed to move toward the engagement direction.

On the other hand, in a case where the engagement pin 551 is displaced from the through hole 545 (or the engagement concave portion 515) in the circumferential direction, the engagement pin 551 is brought into contact with a wall surface of the first side bevel gear 541 (or the ring gear 510) so that the switching slider 550 is prohibited from moving toward the engagement direction.

When such a situation arises, only the operating-side arm 630 moves toward the engagement direction while elastically deforming the coil spring 640 in a state where the operated-side arm 620 remains at the position at which it is disposed at that moment (see FIGS. 15B and 16B).

That is, the engagement pin 551 of the switching slider 550 is brought into contact with the wall surface of the first side bevel gear 541 (or the ring gear 510) in a state where the coil spring 640 keeps pressing the operated-side arm 620 toward the engagement direction through the operated-side pin 621 by the retained elasticity of the coil spring 640.

At that moment, the operated-side pin 621 moves toward the end of the slit 636 that is positioned on the upstream side in the engagement direction of the operating-side arm 630 in comparison with the slit 636 (see FIGS. 15B and 16B).

When the engagement pin 551 of the switching slider 550 agrees with the through hole 545 (or the engagement concave portion 515) in a state shown in FIGS. 15B and 16B, that is, in a state where the coil spring 640 presses the operated-side arm toward the engagement direction by the retained elasticity of the coil spring 640, the switching slider 550 is moved toward the engagement direction.

In other words, in the pressing mechanism 600C according to the second modified example, the operating-side arm 630 functions as an operating-side member that receives an operating force from an outside for moving the switching slider 550, while the shift fork shaft 610 and the operated-side arm 620 function as an operated-side member that is operatively connected to the switching slider 550.

In this case, the operating-side pin 631, the operated-side pin 621, the coil spring 640 and the slit 636 function as an intermediary member that transmits the movement of the operating-side member to the operated-side member. The intermediary member transmits the movement of the operating-side member to the operated-side member through the spring member in a case where the movement of the operating-side member causes the switching slider 550 to move toward the engagement direction, while transmitting the movement of the operating-side member to the operated-side member without the spring member in a case where the movement of the operating-side member causes the switching slider 550 to move toward the release direction.

Hereinafter, a second modified example 500B of the differential gear device 300 will be explained with reference to the attached drawings.

FIG. 17 is a cross sectional view of the differential gear device 500B.

In the drawing, the same reference numerals are denoted for the same components as those of the first modified example 500 to omit the detailed explanation thereof.

As shown in FIG. 17, the differential gear device 500B includes a first side bevel gear 570 and a switching slider 580 in place of the first side bevel gear 541 and the switching slider 550, respectively, and further includes a differential case 560 integrally rotated with the input gear 510, in comparison with the differential gear device 500.

More specifically, the differential gear device 500B includes the input gear 510, the supporting shaft 520, the bevel pinion 530, the first side bevel gear 570 that is positioned on one side of the supporting shaft 520 in the rotational axis line and engages with the bevel pinion 530, the second side bevel gear 542, the differential case 560 and the switching slider 580.

In the second modified example, the supporting shaft 520 is supported by the differential case 560.

As shown in FIG. 17, the first side bevel gear 570 includes a gear portion 571 that is positioned on one side of the supporting shaft 520 in the rotational axis line and engages with the bevel pinion 530, and a shaft portion 575 that is arranged coaxially with the rotational axis line and supports the gear portion 571 in a relatively non-rotatable manner with respect thereto.

The shaft portion 575 is arranged coaxially with the first output shaft 501 in a state where it is relatively rotatable with respect thereto, the first output shaft 501 supporting the switching slider 580 in a relatively non-rotatable, manner with respect thereto and in a movable manner along the axis line.

The switching slider 580 connects the first output shaft 310(1) to both the differential case 560 and the shaft portion 575 in a relatively non-rotatable manner with respect thereto when being disposed at the differential-lock position, connects the first output shaft 310(1) to the shaft portion 575 in a relatively non-rotatable manner with respect thereto while making the first output shaft 310(1) relatively rotatable with respect to the differential case 560 when being disposed at the differential position, and makes the first output shaft 310(1) relatively rotatable with respect to both the differential case 560 and the shaft portion 575 when being disposed at the free-wheel position.

As shown in FIG. 17, an end portion of the first output shaft 310(1) that faces the shaft portion 575 has a spline 311a that is formed on an outer circumferential surface, and the switching slider 580 has an inner-side spline 581 that is formed on an inner circumferential surface and engages with the spline 311a.

An end of the shaft portion 575 that faces the first output shaft 310(1) has a spline 575a that is formed on an outer circumferential surface and that is capable of engaging with the inner-side spline 581.

Further, the switching slider 580 has an outer-side spline 582 that is formed on an outer circumferential surface, and the differential case 560 has a spline 560a capable of engaging with the outer-side spline 582.

When the switching slider 580 is disposed at the free-wheel position, the inner-side spline 581 disengages from the spline 575a of the shaft portion 575 and the outer-side spline 582 disengages from the spline 560a of the differential case 560.

When the switching slider 580 is moved from the free-wheel position toward the engagement direction that is one side in the axis line direction until the differential position, the inner-side spline 581 engages with the spline 311a of the first output shaft 310(1) and also engages with the spline 575a of the shaft portion 575. At that moment, the outer-side spline 582 disengages from the spline 560a of the differential case 560.

When the switching slider 580 is moved from the differential position toward the engagement direction until the differential-look position, the inner-side spline 581 engages with the spline 311a of the first output shaft 310(1) and also engages with the spline 575a of the shaft portion 575. At that moment, the outer-side spline 582 engages with the spline 560a of the differential case 560.

The differential gear device 500B includes a pressing mechanism 600D that is different from the pressing mechanisms 600, 600B, 600C.

Figure 18:
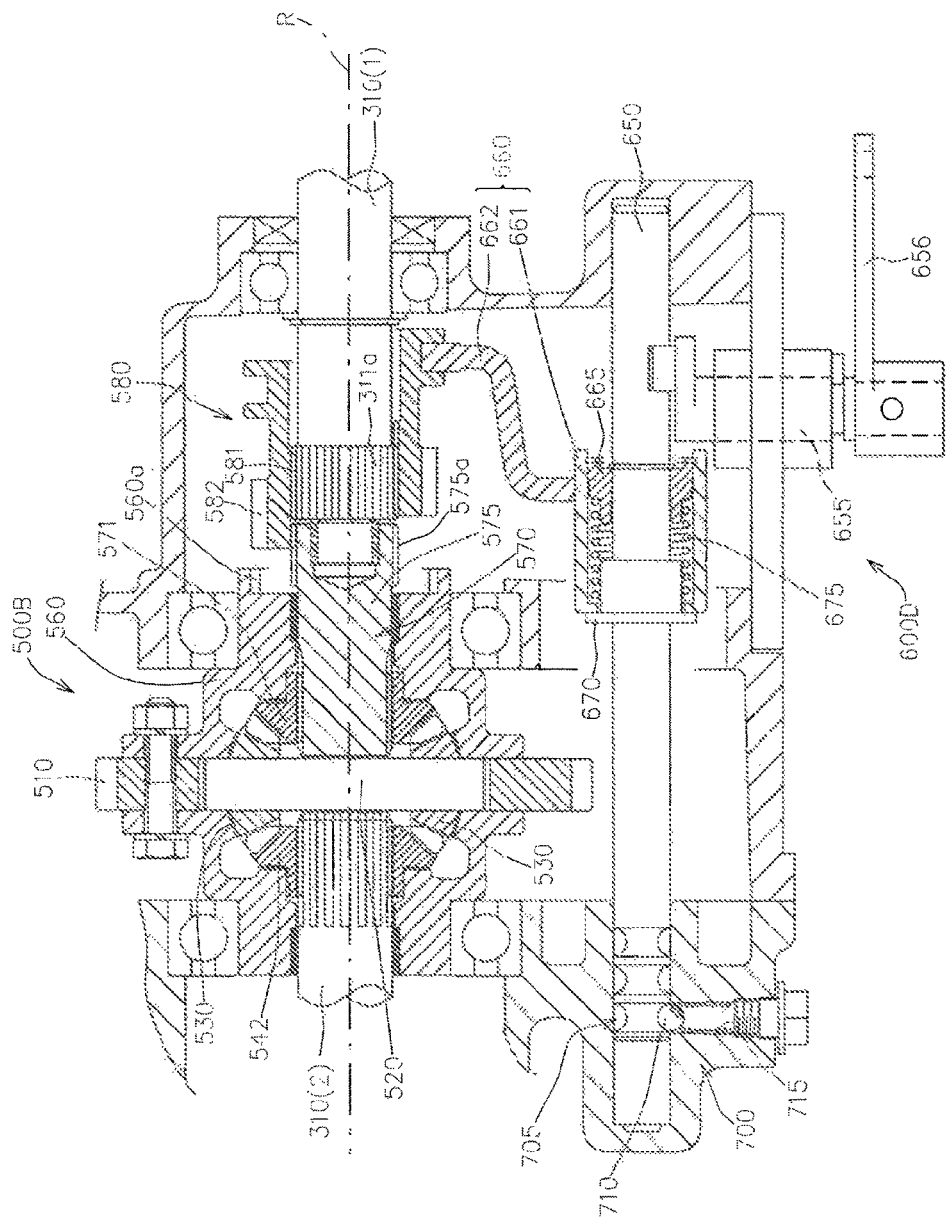
FIG. 18 is a cross sectional view of the differential gear device shown in FIG. 17 with a pressing mechanism according to a third modified example.

FIG. 18 is a cross sectional view of the differential gear device 500 with the pressing mechanism 600D.

As shown in FIG. 18, the pressing mechanism 600D includes a shifter shaft 650, an operating shaft 655, an operating-side arm 656, a fork member 660, an engagement-side pressing member 665 and a release-side pressing member 670. The shifter shaft 650 is arranged substantially parallel to the movement direction of the switching slider 580 and is movable along the axis line direction. The operating shaft 655 presses the shifter shaft 650 toward the engagement direction that is one side in the axis line direction when being rotated to a first direction around the axis line, and presses the shifter shaft 650 toward the release direction that is the other side in the axis line direction when being rotated to a second direction around the axis line. The operating-side arm 656 is supported by the operating shaft 655 in a relatively non-rotatable manner with respect thereto. The fork member 660 includes a hollow portion 661 inserted around the shifter shaft 650 in a relatively immovable manner in the axis line direction with respect thereto and a fork portion 662 that extends from the hollow portion 661 to engage with the switching slider 580. The engagement-side pressing member 665 is provided at the shifter shaft 650, and presses the hollow portion 661 toward the engagement direction through a spring 675 that functions as the spring member when the shifter shaft is moved to the engagement direction. The release-side pressing member 670 is provided at the shifter shaft 650, and presses the hollow portion 661 toward the release direction without the spring 675 when the shifter shaft 650 is moved to the release direction.

In the pressing mechanism 600D, the operating-side arm 656, the operating shaft 655 and the shifter shaft 650 functions as the operating-side member that receives the operating force from an outside for moving the switching slider 580, the fork member 660 function as the operated-side member that is operatively connected to the switching slider 580, and the engagement-side pressing member 665, the release-side pressing member 670 and the spring 675 function as the intermediary member.

It is of course possible that the pressing mechanism 600D is applied to the differential gear device 500, and any one of the pressing mechanisms 600, 600B, 600C is applied to the differential gear device 500B.

What is claimed is:

1. A continuously variable transmission comprising:
a driving shaft and a driven shaft;
a casing that supports the driving shaft and the driven shaft so as to be substantially parallel to each other and be rotatable around respective axis lines while allowing the driving shaft to be operatively connected to a driving power source;
a belt type variable speed-change mechanism that includes a driving-side pulley supported by the driving shaft in a non-rotatable manner relative to the driving shaft, and a driven-side pulley supported by the driven shaft in a non-rotatable manner relative to the driven shaft, the belt type variable speed-change mechanism being accommodated in the casing and transmitting a rotational power from the driving shaft to the driven shaft in a state capable of continuously varying a rotational speed of the rotational power to be transmitted to the driven shaft;
a constant-speed power-transmitting mechanism that includes a constant-speed driven-side rotational body supported by the driven shaft in a rotatable manner relative to the driven shaft, the constant-speed power-transmitting mechanism being accommodated in the casing and transmitting the rotational power at a constant-speed from the driving shaft to the constant-speed driven-side rotational body; and
a planetary gear mechanism that is supported by the driven shaft in the casing and that includes a sun gear supported by the driven shaft in a non-rotatable manner relative to the driven shaft so as to receive a variable-speed rotational power through the driven shaft, a carrier supported by the constant-speed driven-side rotational body so as to receive a constant-speed rotational power through the constant-speed driven-side rotational body and an internal gear outputting a rotational power made by combining the rotational power of the sun gear and the carrier,
wherein the carrier supports a planetary gear in a rotatable manner around an axis line, and
wherein the planetary gear revolves around the sun gear.

2. A continuously variable transmission according to claim 1, wherein the casing is detachably mounted to a fixed construction and has an access opening that allows the internal gear to output the rotational power in a state where the casing is mounted to the fixed construction.

3. A continuously variable transmission according to claim 1, wherein the casing includes an accommodation space that is divided in a liquid-tight manner into a first chamber for accommodating the belt type variable speed-change mechanism and a second chamber for accommodating the constant-speed power-transmitting mechanism and the planetary gear mechanism.

4. A working vehicle comprising a driving power source, an axle unit and the continuously variable transmission according to claim 1, the axle unit including an axle input shaft, paired right and left driving axles, a differential gear device capable of transmitting the rotational power that has been input from the axle input shaft to the paired driving axles in a differential manner to each other, and an axle case that supports the axle input shaft and the paired driving shafts and that accommodates the differential gear device,
wherein the internal gear is provided with output teeth for outputting the rotational power,
wherein the casing is detachably connected to the axle case that functions as the fixed construction, and
wherein the output teeth of the internal gear engage with a gear provided at the axle input shaft through the access opening in a state where the casing is connected to the axle case.

5. A working vehicle according to claim 4,
wherein the casing is mounted to the axle case in such a manner as that an arrangement direction of the driving shaft and the driven shaft is along the driving axles,
wherein the working vehicle further includes right and left supporting stays arranged on both sides of a portion of the axle case that accommodates the differential gear device with respect to the axis line of the paired driving axles, and
wherein the supporting stay has a bearing portion that is provided at a proximal end portion and into which the corresponding driving axle is inserted in a rotatable manner around the axis line, and directly or indirectly supports the casing in a state where it is supported by the corresponding driving axle through the supporting stay.

6. A continuously variable transmission comprising:
a driving shaft and a driven shaft;
a casing that supports the driving shaft and the driven shaft so as to be substantially parallel to each other and be rotatable around respective axis lines while allowing the driving shaft to be operatively connected to a driving power source;
a belt type variable speed change mechanism that is accommodated in the casing and that transmits a rotational power from the driving shaft to the driven shaft in a state capable of continuously varying a rotational speed of the rotational power to be transmitted to the driven shaft;
a constant-speed power-transmitting mechanism that is accommodated in the casing and that transmits the rotational power at a constant-speed from the driving shaft to a constant-speed driven-side rotational body supported by the driven shaft in a rotatable manner relative to the driven shaft;
a planetary gear mechanism that is supported by the driven shaft in the casing and that includes a first element receiving a variable-speed rotational power through the driven shaft, a second element receiving a constant-speed rotational power through the constant-speed driven-side rotational body and a third element outputting a rotational power made by combining the rotational power of the first and second elements; and
the casing including an accommodation space that is divided in a liquid-tight manner into a first chamber for accommodating the belt type variable speed-change mechanism and a second chamber for accommodating the constant-speed power-transmitting mechanism and the planetary gear mechanism.

* * * * *